(12) United States Patent
Nam et al.

(10) Patent No.: US 8,477,701 B2
(45) Date of Patent: Jul. 2, 2013

(54) METHOD OF ALLOCATING RESOURCE IN WIRELESS COMMUNICATION SYSTEM

(75) Inventors: Seung Woo Nam, Anyang-si (KR); Jong Min Kim, Anyang-si (KR); Moon Il Lee, Anyang-si (KR); Hyung Ho Park, Anyang-si (KR); Jin Soo Choi, Anyang-si (KR); Jae Hoon Chung, Anyang-si (KR); Jong Young Han, Anyang-si (KR); Han Gyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 12/677,656

(22) PCT Filed: Sep. 22, 2008

(86) PCT No.: PCT/KR2008/005625
§ 371 (c)(1),
(2), (4) Date: Mar. 11, 2010

(87) PCT Pub. No.: WO2009/041770
PCT Pub. Date: Apr. 2, 2009

(65) Prior Publication Data
US 2010/0208673 A1      Aug. 19, 2010

Related U.S. Application Data

(60) Provisional application No. 60/974,579, filed on Sep. 24, 2007.

(30) Foreign Application Priority Data

Feb. 5, 2008   (KR) .................. 10-2008-0011898
Feb. 5, 2008   (KR) .................. 10-2008-0011899

(51) Int. Cl.
*H04W 4/00* (2009.01)
*G01R 31/08* (2006.01)
*H04J 1/00* (2006.01)

(52) U.S. Cl.
USPC ........................... 370/329; 370/252; 370/480

(58) Field of Classification Search
None
See application file for complete search history.

(56) References Cited

U.S. PATENT DOCUMENTS

| | | | |
|---|---|---|---|
| 7,069,009 B2 | 6/2006 | Li et al. | |
| 2007/0189197 A1 | 8/2007 | Kwon et al. | |
| 2008/0013599 A1* | 1/2008 | Malladi | 375/132 |
| 2008/0240034 A1* | 10/2008 | Gollamudi | 370/330 |
| 2009/0010238 A1* | 1/2009 | Barak et al. | 370/342 |
| 2009/0073932 A1* | 3/2009 | McBeath et al. | 370/330 |

* cited by examiner

*Primary Examiner* — Kevin C Harper
*Assistant Examiner* — Samina Choudhry
(74) *Attorney, Agent, or Firm* — McKenna Long and Aldridge LLP

(57) ABSTRACT

A method of allocating resources in a wireless communication system includes allocating a plurality of physical resource blocks, each of which includes a plurality of sub-parts, to a virtual resource block, and mapping the virtual resource block to the plurality of physical resource blocks, wherein the virtual resource block is mapped to the sub-parts located in different positions in the range of each physical resource block. The number of resource elements allocated for the virtual resource block is constantly maintained.

6 Claims, 21 Drawing Sheets

Title: METHOD OF ALLOCATING RESOURCE IN WIRELESS COMMUNICATION SYSTEM

This application is a 35 U.S.C. §371 National Stage entry of International Application No. PCT/KR2008/005625, filed on Sep. 22, 2008, and claims priority to U.S. Provisional Application No. 60/974,579, filed Sep. 24, 2007, Korean Application No. 10-2008-0011899, filed on Feb. 5, 2008, and Korean Application No. 10-2008-0011898, filed on Feb. 5, 2008, each of which is hereby incorporated by reference in its entirety as if fully set forth herein.

TECHNICAL FIELD

The present invention relates to wireless communications, and more particularly, to a method of allocating radio resources.

BACKGROUND ART

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future.

Hereinafter, a downlink (DL) denotes a communication link from a base station (BS) to a user equipment (UE), and an uplink (UL) denotes a communication link from the UE to the BS.

The BS schedules radio resources allocated to the UE. A resource block is a basic unit of radio resources allocated to the UE. The BS allocates al least one resource block to the UE. DL data or UL data is transmitted using the resource block allocated to the UE. For frequency diversity, actual data can be transmitted in a distributed manner over the entire frequency band. This is called distributed transmission. A resource block allocated to the UE is referred to as a virtual resource block. A resource block in an actual physical channel is referred to as a physical resource block. For distributed data transmission, the physical resource block is divided into a plurality of sub-parts. The virtual resource block is mapped in a distributed manner to sub-parts each of which belongs to different physical resource blocks. The physical resource block includes reference signals for demodulation. The number of reference signals arranged for each sub-part may not be constant. As the number of reference signals increases, the region for data transmission is reduced. In a case where the virtual resource block is persistently mapped to specific sub-parts including more reference signals than other sub-parts, an actual region for data transmission is allocated less in size than other virtual resource blocks. As a result, an effective code rate for data transmission increases. When the effective code rate increases, transmitted data is significantly affected by a channel environment.

Accordingly, there is a need for a method for allocating an actual resource region having a constant size with respect to each of virtual resource blocks irrespective of arrangement of reference signals when data is transmitted in a distributed transmission procedure.

DISCLOSURE OF INVENTION

Technical Problem

The present invention provides a method of constantly allocating an actual resource region, to which virtual resource blocks are mapped, to each virtual resource block irrespective of arrangement of reference signals.

The present invention also provides a method of maintaining a consecutive mapping pair in a process of distributed mapping from a virtual resource block to a physical resource block.

Technical Solution

In an aspect, a method of allocating resources in a wireless communication system method includes allocating a plurality of physical resource blocks, each of which includes a plurality of sub-parts, to a virtual resource block, and mapping the virtual resource block to the plurality of physical resource blocks, wherein the virtual resource block is mapped to the sub-parts located in different positions in the range of each physical resource block.

In another aspect, a method of allocating resources in a wireless communication system includes selecting Nd sub-parts distributed over the entire frequency band, and mapping a virtual resource block to the Nd sub-parts, wherein the Nd sub-parts are respectively included in different physical resource blocks and occupy different positions in each physical resource block, where Nd is an integer greater than 1.

In another aspect, a method of allocating resources in a wireless communication system includes dividing a physical resource block into a plurality of sub-parts, and allocating the plurality of sub-parts to different user equipments respectively, wherein the plurality of sub-parts is divided so that an even number of resource elements other than reference signals are provided in a frequency domain.

In another aspect, a method of allocating resources in a wireless communication system includes selecting Nd sub-parts distributed over the entire frequency band, and mapping a virtual resource block by dividing the virtual resource block into the Nd sub-parts, wherein each Nd sub-part has an even number of resource elements other than reference signals in a frequency domain, where Nd is an integer greater than 1.

Advantageous Effects

According to the present invention, a number of resource elements allocated for the virtual resource block is constantly maintained irrespective of arrangement of reference signals. Deterioration in spectral efficiency can be avoided when specific data is transmitted.

A consecutive mapping pair is maintained in distributed mapping from the virtual resource block to the physical resource block. A multiple input multiple output (MIMO) technique can be applied in a flexible manner.

MODE FOR THE INVENTION

Figure 1:
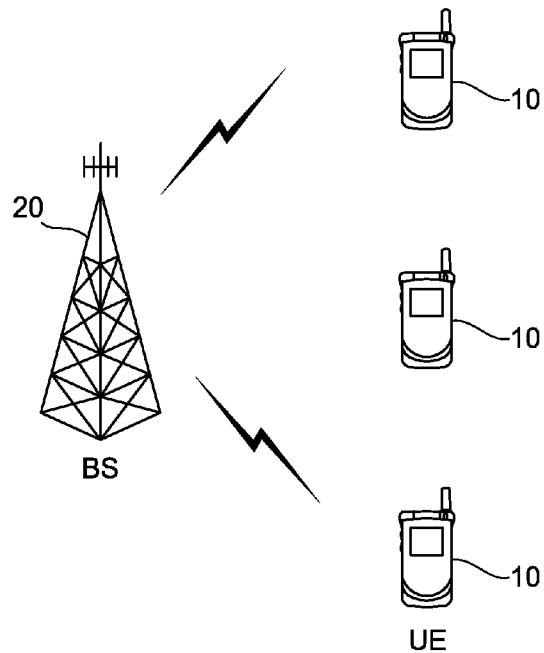
FIG. 1 shows a wireless communication system.

FIG. 1 shows a wireless communication system.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

The wireless communication system may be an orthogonal frequency division multiplexing (OFDM)/orthogonal frequency division multiple access (OFDMA)-based system.

The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

The wireless communication system may be a multiple antenna system. The multiple antenna system may be a multiple-input multiple-output (MIMO) system. The multiple antenna system may be a multiple-input single-output (MISO) system or a single-input multiple-output (SIMO) system. The MIMO system uses a plurality of transmit (Tx) antennas and a plurality of receive (Rx) antennas. The MISO system uses a plurality of Tx antennas and one Rx antenna. The SIMO system uses one Tx antenna and a plurality of Rx antennas.

Figure 2:
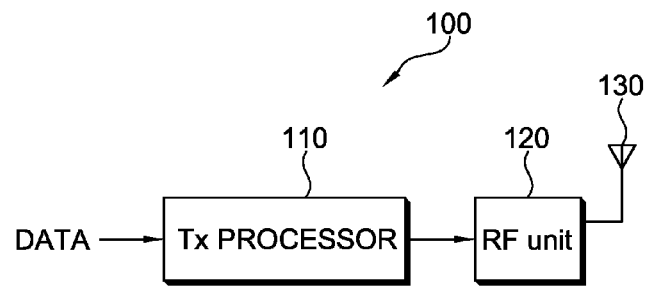
FIG. 2 is a block diagram showing a structure of a transmitter.

FIG. 2 is a block diagram showing a structure of a transmitter.

Referring to FIG. 2, a transmitter 100 includes a Tx processor 110 and a radio frequency (RF) unit 120. The Tx processor 110 performs a process for transmitting input data. The Tx processor 110 can allocate the input data to a virtual resource block (VRB), and can map the VRB to a physical resource block (PRB). A resource block is a basic unit of radio resources allocated to the UE. The PRB may include a plurality of subcarriers. The PRB may be defined with a predetermined number of subcarriers in a frequency domain and one subframe in a time domain. The VRB may have the same size as the PRB. The PRB denotes a time-frequency resource region of a physical channel for transmitting actual data. The VRB denotes a resource region used before mapping to the PRB is made.

The RF unit 120 transmits data processed by the Tx processor 110 through a Tx antenna 130. Although it has been depicted herein that the Tx antenna 130 use one antenna, the Tx antenna 130 may use a plurality of antennas. The transmitter 100 may be a part of a BS in downlink, and may be a part of a UE in uplink.

Figure 3:
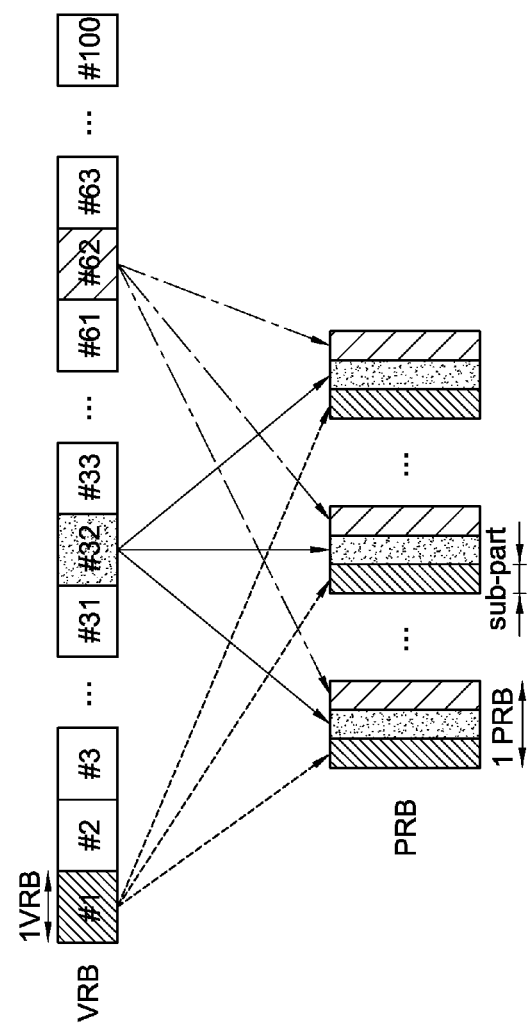
FIG. 3 shows an example of distributed mapping from a virtual resource block (VRB) to a physical resource block (PRB).

FIG. 3 shows an example of distributed mapping from a VRB to a PRB.

Referring to FIG. 3, one VRB can be mapped to a plurality of PRBs in a distributed manner. That is, one VRB can be divided into Nd fragments and then mapped to Nd PRBs, where Nd is an integer greater than 1. In this case, each PRB can be divided into Nd sub-parts. Nd may be the number of distributed fragments of one VRB, or may be the number of sub-parts included in one PRB and divided for distributed mapping.

If Nd=3, one PRB is divided into 3 sub-parts, and one VRB is divided into 3 fragments. The divided 3 fragments are respectively mapped to 3 different PRBs. In this case, sub-parts to which one VRB is mapped are located in the same position in the 3 PRBs. For example, if VRBs #1, #32, and #62 are mapped to 3 PRBs in a distributed manner, the VRB #1 is mapped to a first sub-part in each of the 3 PRBs. The VRB #32 is mapped to a $2^{nd}$ sub-part in each of the 2 PRBs. The VRB #62 is mapped to a $3^{rd}$ sub-part in each of the 3 PRBs. The 3 VRBs may be allocated to different UEs.

Figure 4:
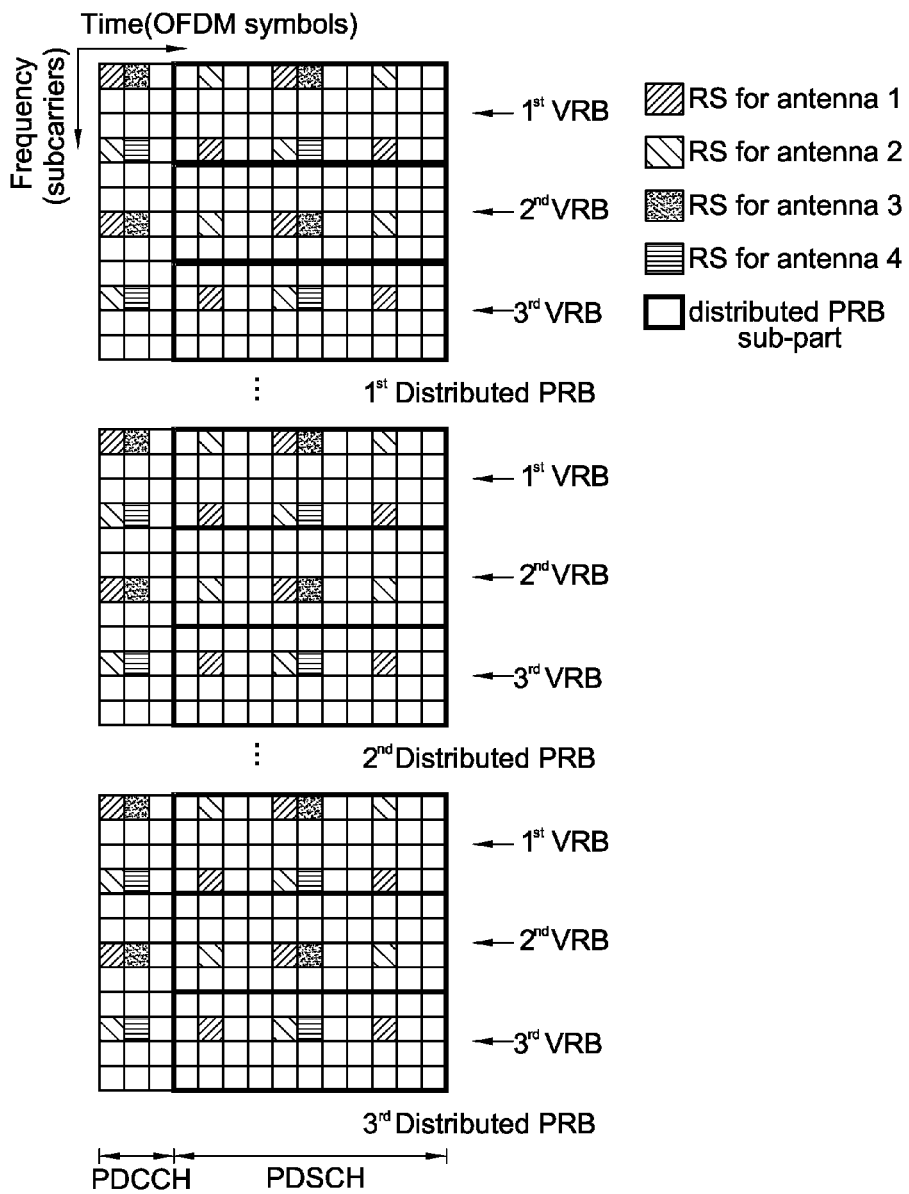
FIG. 4 shows an example of sub-parts of a PRB to which a VRB is mapped in a distributed manner.

FIG. 4 shows an example of sub-parts of a PRB to which a VRB is mapped in a distributed manner.

Referring to FIG. 4, the PRB is a basic unit of radio resources allocated to a UE in a physical layer. The PRB can include a plurality of subcarriers. It will be assumed herein that the PRB includes 12 consecutive subcarriers in a frequency domain and 14 OFDM symbols in a time domain. The PRB can be divided into a control region for control signals and a data region for user data. In downlink, a physical downlink control channel (PDCCH) may be used as the control region, and a physical downlink shared channel (PDSCH) may be used as the data region. The PDCCH may include 3 OFDM symbols. The PDSCH may include 11 OFDM symbols.

If a resource element is a region defined with one subcarrier and one OFDM symbol, the PRB includes 12×14 resource elements. Symbols for control signals, user data, reference signals (RS), etc., are mapped to the resource elements. The symbols for control signals may be mapped to a resource element of the PDCCH. The symbols for user data may be mapped to a resource element of the PDSCH. The RSs are signals for demodulating the control signals or the user data, and may be located in arbitrary positions in the PRB in a distributed manner. In the multiple antenna system, the RSs may be assigned for respective antennas. For example, in the MIMO system (or the MISO system) using 4 Tx antennas, the RSs can be assigned for the respective Tx antennas. Alternatively, an RS for an antenna 1, an RS for an antenna 2, and an RS for an antenna 3, and an RS for an antenna 4 can be arranged on the PDCCH and the PDSCH in a distributed manner without overlapping.

If Nd=3, one PRB is divided into 3 sub-parts. In the PDSCH, each sub-part includes 4 subcarriers in the frequency domain and 11 OFDM symbols in the time domain. It will be assume that, as shown in FIG. 3, distributed mapping from a VRB to a PRB is carried out. A $1^{st}$ VRB is mapped to a $1^{st}$ sub-part in each of 3 PRBs. A $2^{nd}$ VRB is mapped to a $2^{nd}$ sub-part in each of the 3 PRBs. A $3^{rd}$ VRB is mapped to a $3^{rd}$ sub-part in each of the 3 PRBs.

The number of RSs included in each sub-part may vary. The $1^{st}$ sub-part includes 8 RSs. The $2^{nd}$ sub-part and the $3^{rd}$ sub-part respectively include 4 RSs. When the number of RSs increases in the same-sized sub-part, the number of resource elements for data decreases to the same extent. Data allocated with the $1^{st}$ VRB is transmitted using a less number of resource elements than data allocated with the $2^{nd}$ or $3^{rd}$ VRB. Therefore, an effective code rate may increase, and spectral efficiency may deteriorate. That is, if one piece of data is continuously transmitted by being mapped to a sub-part having a small number of resource elements, a difference of the number of resource elements is continuously accumulated. As a result, the effective code rate may change. Then, transmission of the data may be vulnerable to a channel environment in comparison with transmission of other data. In addition, although the same-sized VRB is allocated for each UE, an amount of data transmittable by any one of the UE may decrease in comparison with that of another UE in a process of mapping from the VRB to the PRB.

Figure 5:
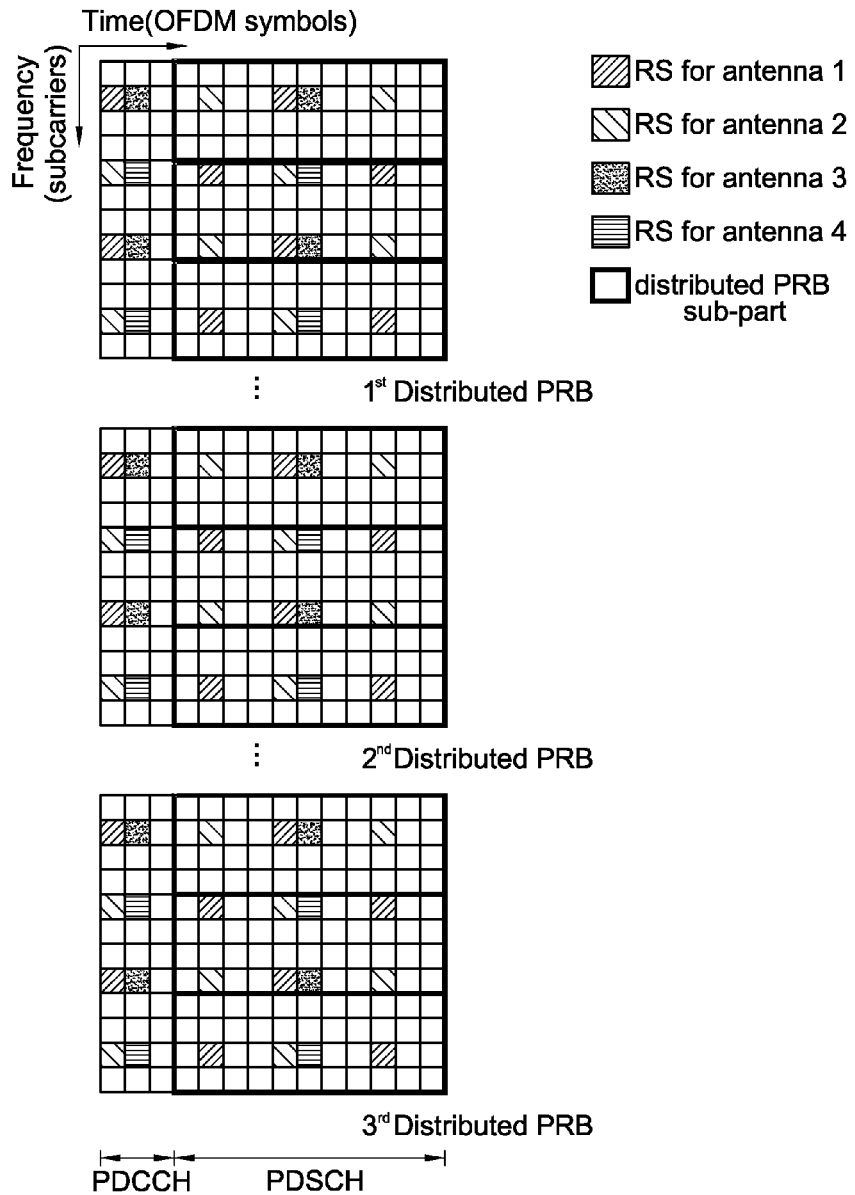
FIG. 5 shows another example of sub-parts of a PRB to which a VRB is mapped in a distributed manner.

FIG. 5 shows another example of sub-parts of a PRB to which a VRB is mapped in a distributed manner.

Referring to FIG. 5, locations of RSs are changed from those of the PRB of FIG. 4. The RSs of FIG. 4 are arranged from a start point of a frequency domain. The RSs of FIG. 5 are arranged from a position spaced apart backward by one subcarrier from the start point of the frequency domain. Since the RSs are shifted by one offset from the start point of the frequency domain, the number of RSs included in 3 sub-parts varies. A $1^{st}$ sub-part and a $3^{rd}$ sub-part respectively include 4 RSs. A $2^{nd}$ sub-part includes 8 RSs. In this case, data transmitted through the $2^{nd}$ sub-part including more RSs may deteriorate in terms of spectral efficiency in comparison with data transmitted through other sub-parts.

Figure 6:
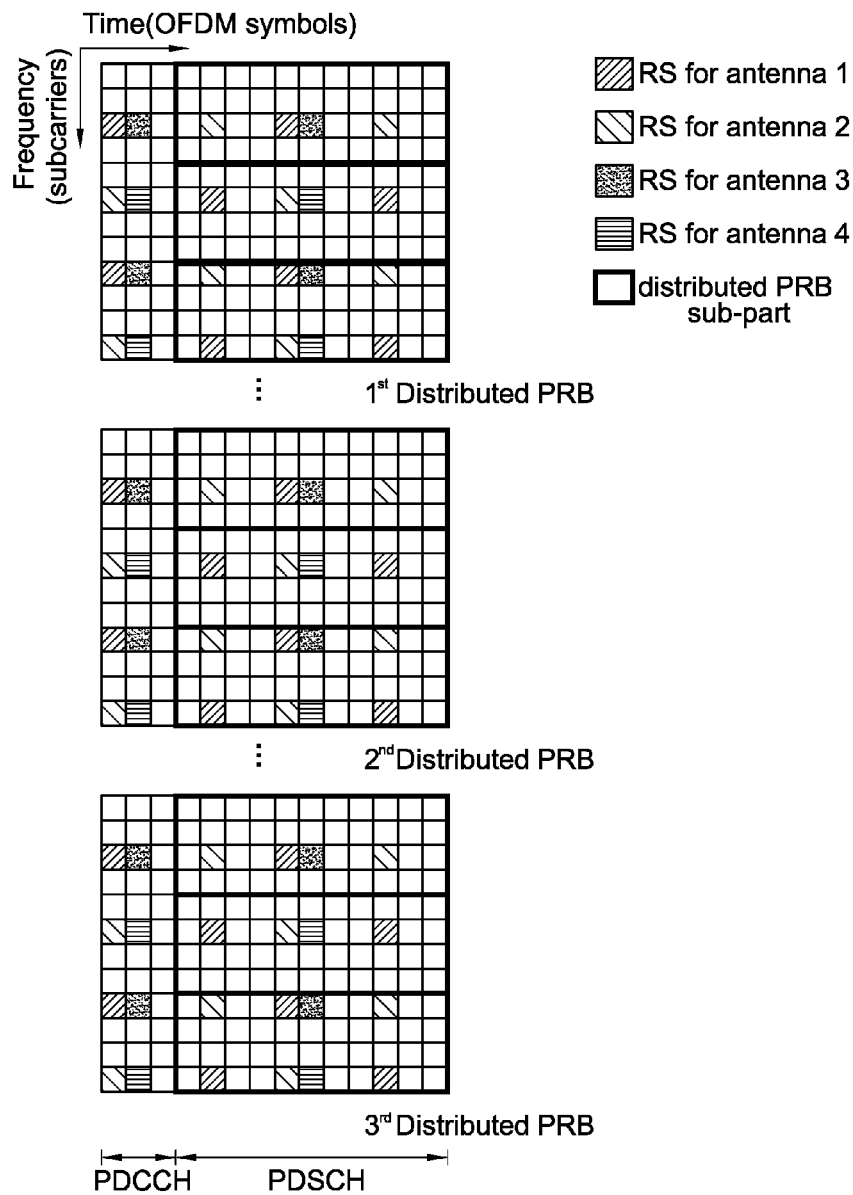
FIG. 6 shows another example of sub-parts of a PRB to which a VRB is mapped in a distributed manner.

FIG. 6 shows another example of sub-parts of a PRB to which a VRB is mapped in a distributed manner.

Referring to FIG. 6, locations of RSs are changed from those of the PRB of FIG. 4. The RSs of FIG. 6 are arranged from a position spaced apart backward by two subcarrier from the start point of a frequency domain. A $1^{st}$ sub-part and a $2^{nd}$ sub-part respectively include 4 RSs. A $3^{rd}$ sub-part includes 8 RSs. In this case, data transmitted through the $3^{rd}$ sub-part including more RSs may deteriorate in terms of spectral efficiency in comparison with data transmitted through other sub-parts.

Hereinafter, for convenience of explanations, a PRB in which RSs are arranged as shown in FIG. 4 is defined as a Case-A PRB. A PRB in which RSs are arranged as shown in FIG. 5 is defined as a Case-B PRB. A PRB in which RSs are arranged as shown in FIG. 6 is defined as a Case-C PRB.

Figure 7:
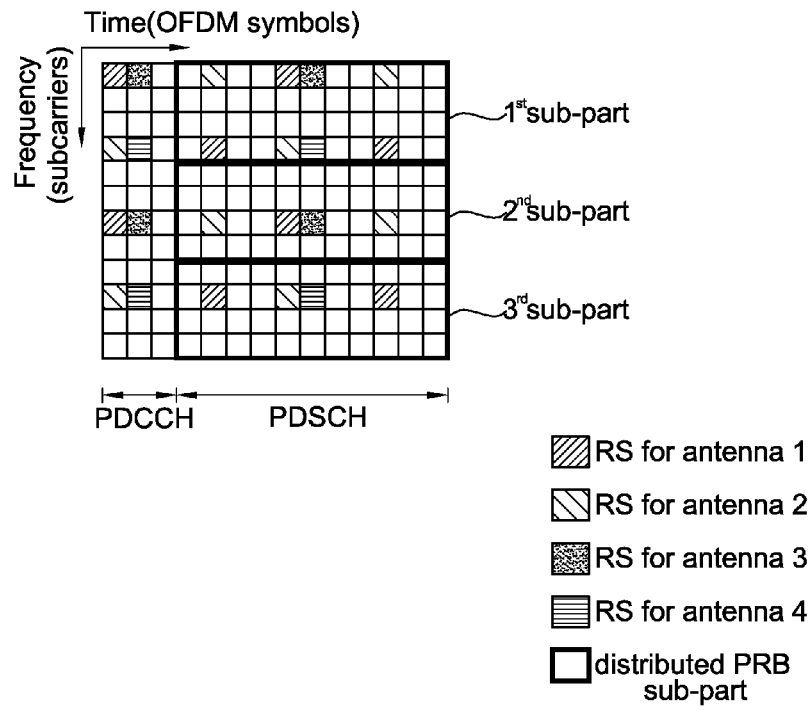
FIG. 7 shows an example of a structure of a distributed PRB.

FIG. 7 shows an example of a structure of a distributed PRB. The Case-A PRB will be exemplified.

Referring to FIG. 7, the PRB includes a plurality of sub-parts. A PRB including a plurality of sub-parts and using distributed mapping can be referred to as a distributed PRB. In a process of distributed mapping from a VRB to the PRB, the number Nd of sub-parts can be determined according to the number of distributed fragments of the VRB. The sub-part can include at least one OFDM symbol belonging to a PDSCH in a time domain. The sub-part includes a plurality of resource elements. The sub-part can include at least one RS.

Figure 8:
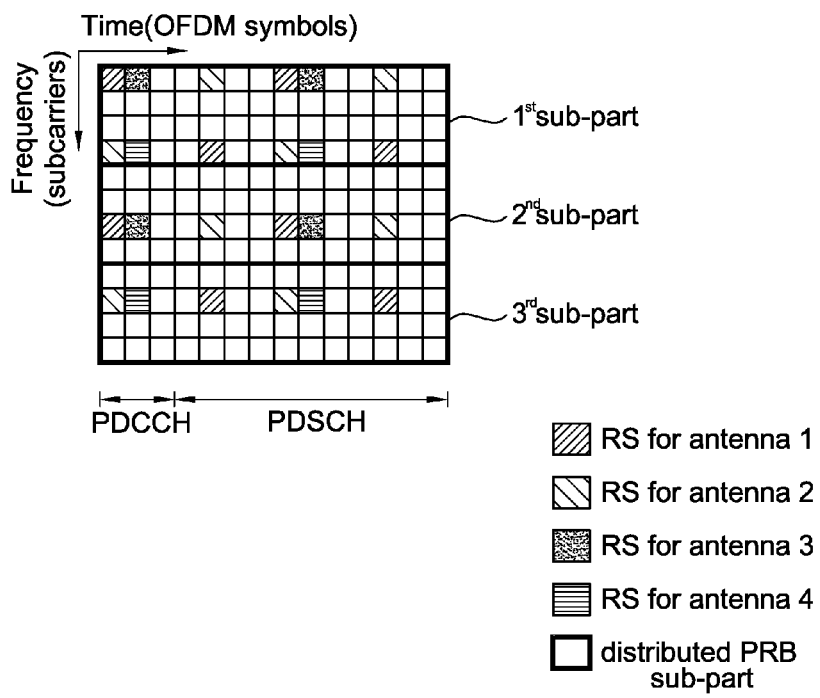
FIG. 8 shows another example of a structure of a distributed PRB.

FIG. 8 shows another example of a structure of a distributed PRB. The Case-A PRB will be exemplified.

Referring to FIG. 8, the PRB includes a plurality of sub-parts. The sub-part includes a plurality of OFDM symbols belonging to a PDCCH and a PDSCH in a time domain.

The aforementioned structures of the PRB (e.g., Case-A PRB, Case-B PRB, and Case-C PRB) are for exemplary purposes only. The range of the PRB may change in the time domain or frequency domain. The number of OFDM symbols included in the PDCCH or the PDSCH may also change. The range and number of sub-parts may change. The location and number of RSs may change. A method to be described below can be applied when the number of resource elements other than the RSs is different from one sub-part to another irrespective of a specific PRB structure.

<Circular Shifted PRB Sub-part Mapping>

Figure 9:
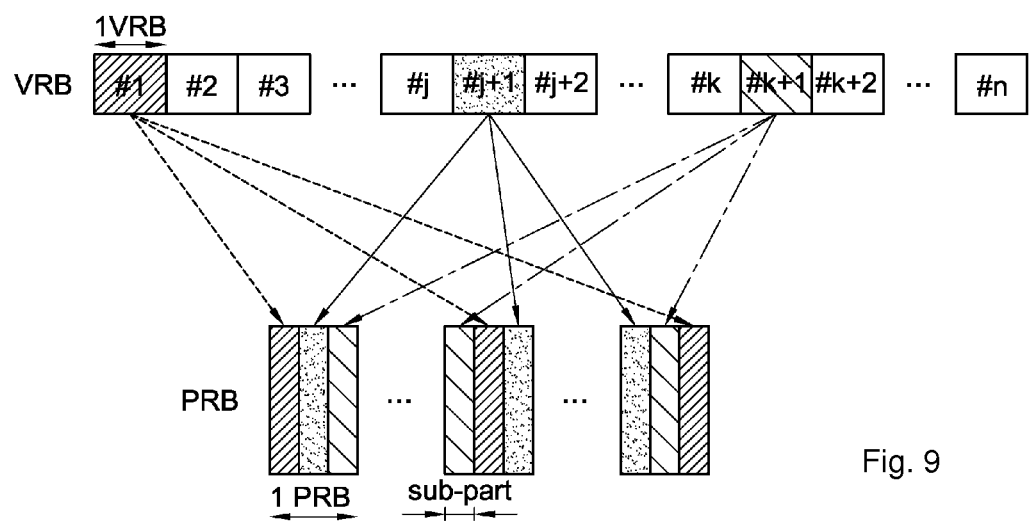
FIG. 9 shows a circular shifted PRB sub-part mapping (CSPSM) method according to an embodiment of the present invention.

A method to be described hereinafter is provided to remove a spectral efficiency difference which may occur when the number of resource elements other than RSs is different from one sub-part to another irrespective of a specific PRB structure FIG. 9 shows a circular shifted PRB sub-part mapping (CSPSM) method according to an embodiment of the present invention.

Referring to FIG. 9, in a process of distributed mapping from a VRB to a PRB, the VRB is circular shifted over Nd sub-parts that occupy different positions in the PRB in the distributed mapping. In other words, sub-parts corresponding to one VRB are circular shifted in Nd PRBs. This is called circular shifted PRB sub-part mapping (CSPSM). According to a type of sub-part, the circular shift may be achieved in a frequency prioritized manner or a time prioritized manner.

It will be assumed that Nd=3 for example. If VRBs #1, #j+1, and #k+1 are mapped in a distributed manner to 3 PRBs by using circular shift, the VRB #1 is mapped to a $1^{st}$ sub-part of a $1^{st}$ PRB, a $2^{nd}$ sub-part of a $2^{nd}$ PRB, and a $3^{rd}$ sub-part of a $3^{rd}$ PRB (where j, k, and n are integers satisfying 1<j<k<n). In addition, the VRB #j+1 is mapped to a $2^{nd}$ sub-part of the $1^{st}$ PRB, a $3^{rd}$ sub-part of the $2^{nd}$ PRB, and a $1^{st}$ sub-part of the $3^{rd}$ PRB. In addition, the VRB #k+1 is mapped to a $3^{rd}$ sub-part of the $1^{st}$ PRB, a $1^{st}$ sub-part of the $2^{nd}$ PRB, and a $2^{nd}$ sub-part of the $3^{rd}$ PRB. That is, when the VRB is mapped in a distributed manner to the Nd PRBs, sub-parts corresponding to the VRB are located in different positions in the Nd PRBs. Sub-parts selected for different VRBs do not overlap in the same PRB.

As such, since the sub-parts selected for different VRBs are located in different positions in the PRB, even if the number of RSs included in each sub-part differs according to the structure of the PRB, the number of RSs provided to each VRB is constant. In addition, the same effective cod rate can be used for each VRB.

Figure 10:
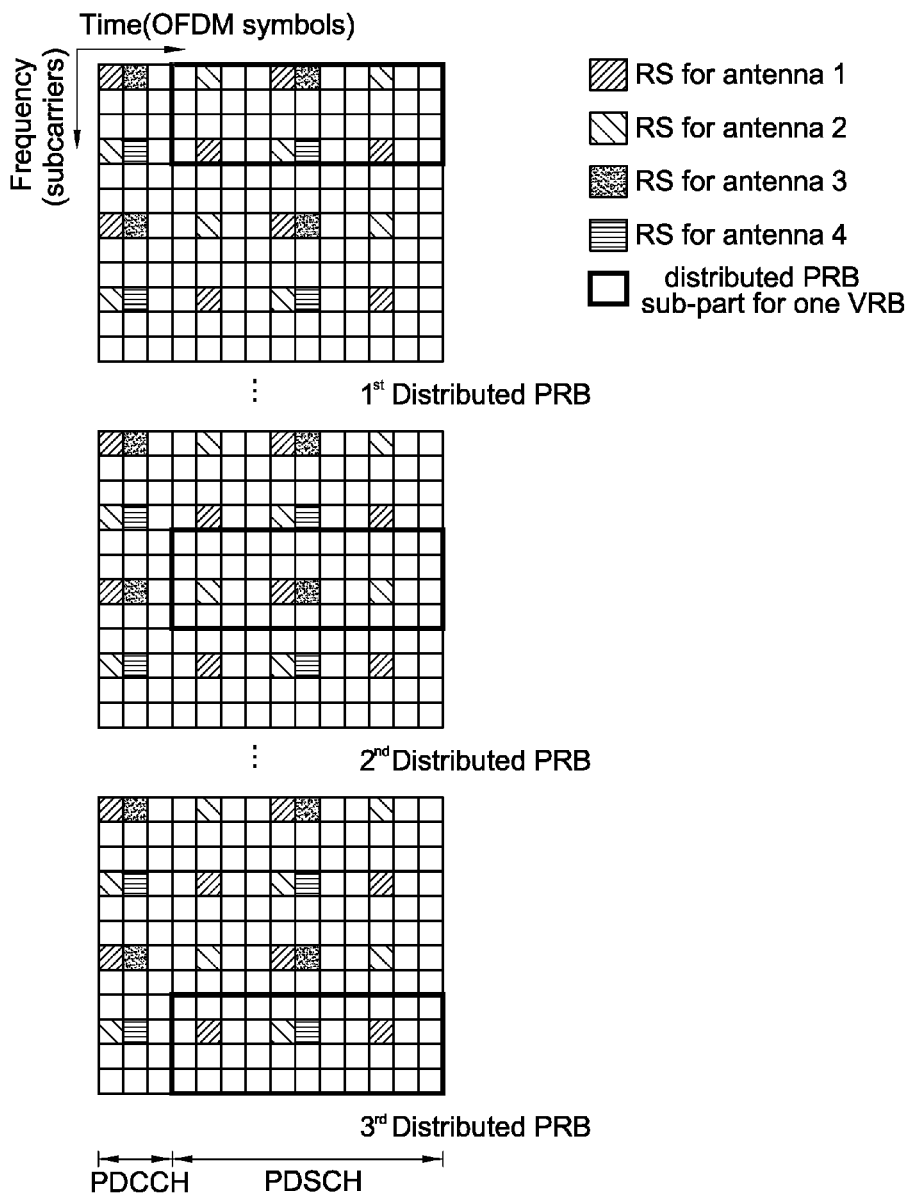
FIG. 10 shows sub-parts of a distributed PRB using CSPSM according to an embodiment of the present invention.

FIG. 10 shows sub-parts of a distributed PRB using CSPSM according to an embodiment of the present invention.

Referring to FIG. 10, the Case-A PRB is exemplified. If Nd=3, the PRB includes 3 sub-parts. In the PRB, a PDCCH is excluded in the range of the 3 sub-parts. That is, the sub-part includes OFDM symbols belonging to a PDSCH in a time domain, and includes 4 subcarriers in a frequency domain.

By using the CSPSM, 3 VRBs are mapped to 3 PRBs. In this case, the VRBs are mapped to sub-parts which are circular shifted in the frequency prioritized manner. A granularity of circular shift is one PRB in the frequency domain and one subframe in the time domain.

As for a $1^{st}$ VRB, 3 sub-parts occupying different positions in the 3 PRBs are selected. For example, a $1^{st}$ sub-part may be selected in a $1^{st}$ PRB. A $2^{nd}$ sub-part may be selected in a $2^{nd}$ PRB. A $3^{rd}$ sub-part may be selected in a $3^{rd}$ PRB. The $1^{st}$ VRB is mapped to the selected 3 sub-parts. Since the sub-parts are selected by being circular shifted in the frequency domain according to the PRB, it can be said that the circular shift is achieved in the frequency prioritized manner. The $1^{st}$ sub-part includes 8 RSs. The $2^{nd}$ sub-part and the $3^{rd}$ sub-part respectively include 4 RSs. That is, 16 RSs are provided to the $1^{st}$ VRB.

As for a $2^{nd}$ VRB, a $2^{nd}$ sub-part is selected in the $1^{st}$ PRB, a $3^{rd}$ sub-part is selected in the $2^{nd}$ PRB, and a $1^{st}$ sub-part is selected in the $3^{rd}$ PRB. The $2^{nd}$ VRB is mapped to the selected 3 sub-parts. 16 RSs are provided to the $2^{nd}$ VRB.

As for a $3^{rd}$ VRB, a $3^{rd}$ sub-part is selected in the $1^{st}$ PRB, a $1^{st}$ sub-part is selected in the $2^{nd}$ PRB, and a $2^{nd}$ sub-part is selected in the $3^{rd}$ PRB. The $3^{rd}$ VRB is mapped to the selected 3 sub-parts. 16 RSs are provided to the $3^{rd}$ VRB.

The 3 VRBs are respectively mapped to PRBs having the same number of RSs. That is, the 3 VRBs are respectively mapped to PRBs having the same number of resource elements. Accordingly, irrespective of RS arrangement, the same effective code rate can be used for data transmitted using each VRB.

Figure 11:
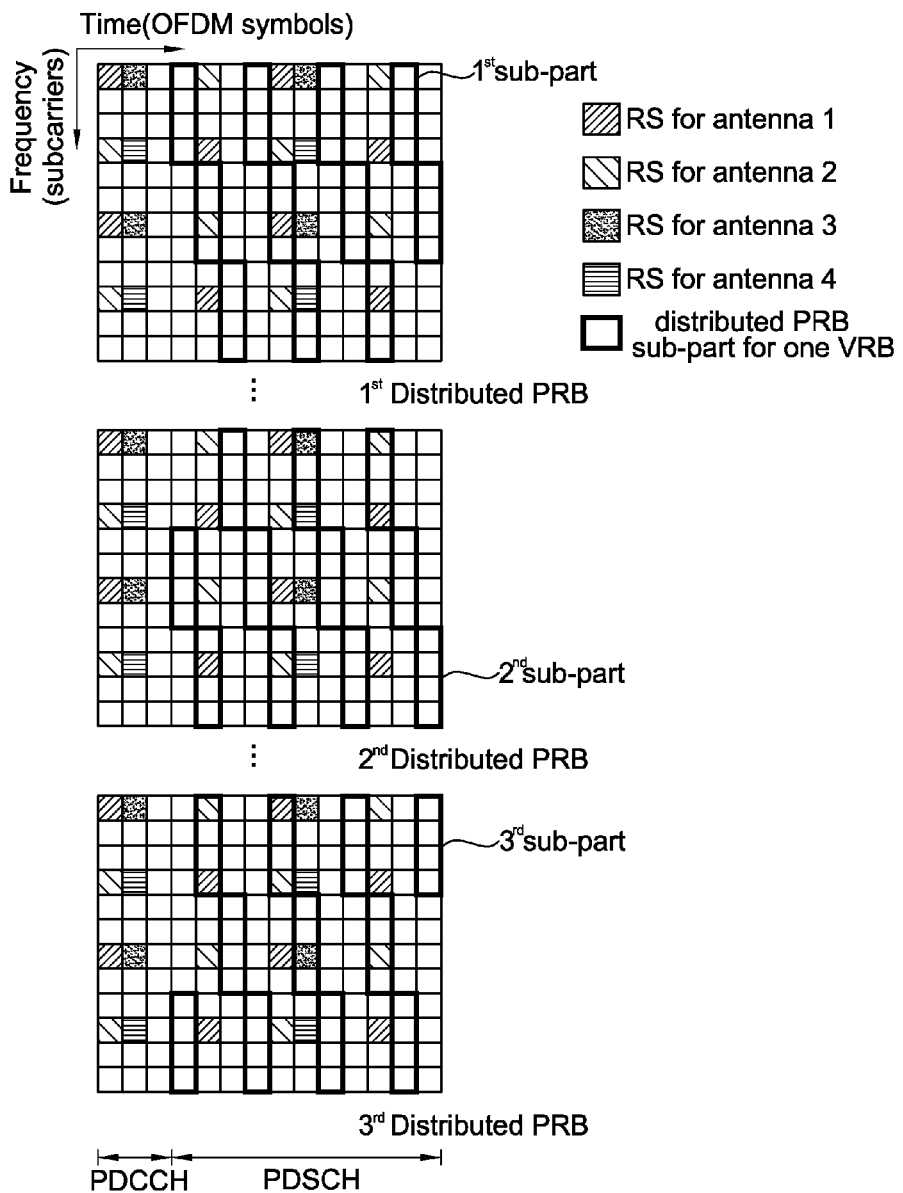
FIG. 11 shows sub-parts of a distributed PRB using CSPSM according to another embodiment of the present invention.

FIG. 11 shows sub-parts of a distributed PRB using CSPSM according to another embodiment of the present invention.

Referring to FIG. 11, the Case-A PRB is exemplified. If Nd=3, the PRB includes 3 sub-parts. The sub-part consists of a group of clusters. The cluster consists of a plurality of resource elements consecutive in a PDSCH. It is assumed herein that the cluster consists of one OFDM symbol and 4 subcarriers. One sub-part includes 11 clusters and 44 resource elements. 3 sub-parts constitute one PDSCH resource region. The 3 sub-parts respectively include 4 RSs, 6 RSs, and 6 RSs. That is, even if the sub-part consists of clusters, the number of resource elements other than the RSs may differ from one sub-part to another.

By using the CSPSM, 3 VRBs are mapped to 3 PRBs. In this case, the VRBs are mapped to sub-parts which are circular shifted in the frequency prioritized manner. A granularity of circular shift is one PRB in the frequency domain and one OFDM symbol in a time domain.

As for a $1^{st}$ VRB, 3 sub-parts occupying different positions in the 3 PRBs are selected. For example, a $1^{st}$ sub-part may be selected in a $1^{st}$ PRB. A $2^{nd}$ sub-part may be selected in a $2^{nd}$ PRB. A $3^{rd}$ sub-part may be selected in a $3^{rd}$ PRB. In the $2^{nd}$ sub-part, all clusters are circular shifted by one cluster (i.e., 4 subcarriers) in the frequency domain with respect to the $1^{st}$ sub-part. In the $3^{rd}$ sub-part, all clusters are circular shifted by one cluster (i.e., 4 subcarriers) in the frequency domain with respect to the $2^{nd}$ sub-part. In the $1^{st}$ sub-part, all clusters are circular shifted by one cluster (i.e., 4 subcarriers) in the frequency domain with respect to the $3^{rd}$ sub-part. The $1^{st}$ VRB is mapped to the selected 3 sub-parts.

As for a $2^{nd}$ VRB, 3 sub-parts located in different positions are selected among sub-parts other than the sub-parts selected for the $1^{st}$ VRB. As for a $3^{rd}$ VRB, 3 sub-parts located in different positions are selected among sub-parts other than the sub-parts selected for the $1^{st}$ and $2^{nd}$ VRBs.

Each of the 3 VRBs is equally provided with 16 RSs. That is, the 3 VRBs are respectively mapped to PRBs having the same number of resource elements. Accordingly, irrespective of RS arrangement, the same effective code rate can be used for data transmitted using each VRB.

Figure 12:
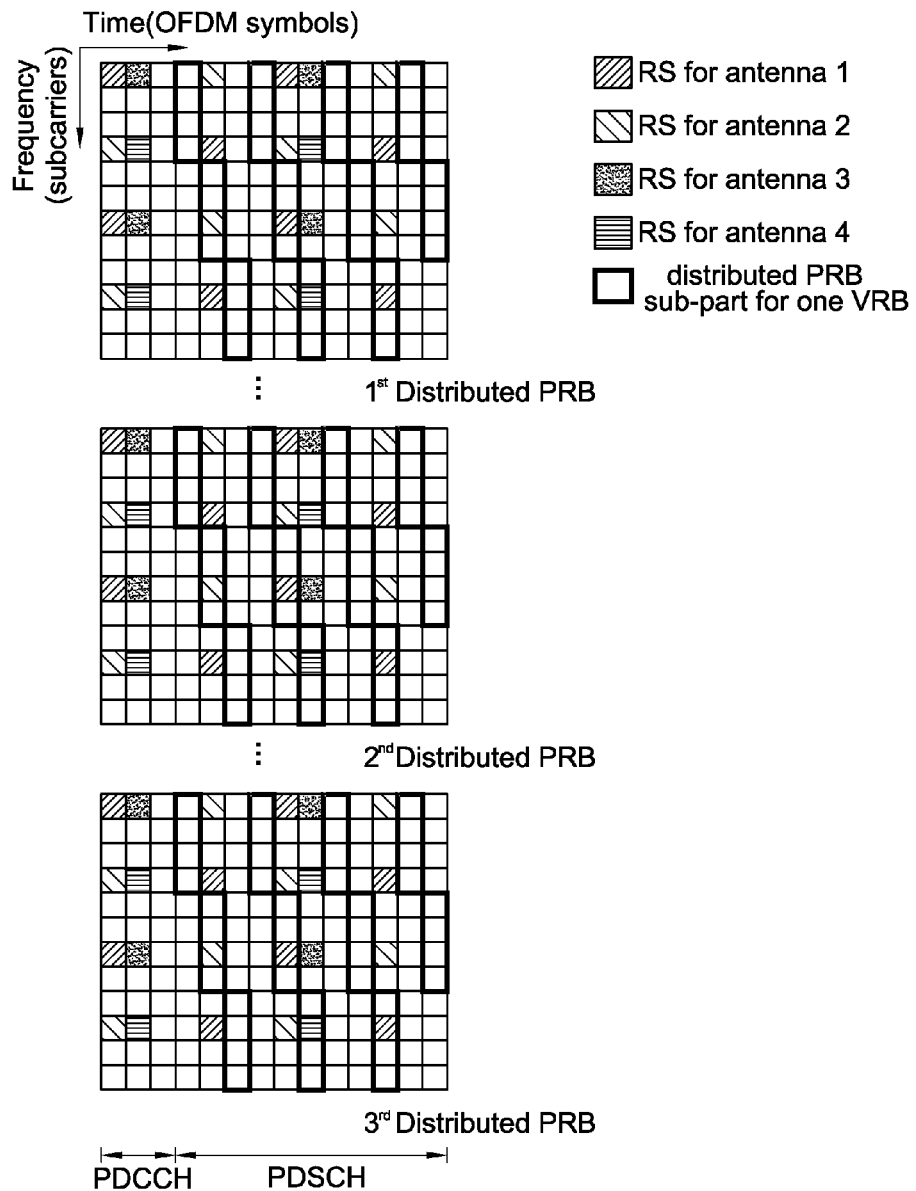
FIG. 12 shows sub-parts of a distributed PRB using CSPSM according to another embodiment of the present invention.

FIG. 12 shows sub-parts of a distributed PRB using CSPSM according to another embodiment of the present invention.

Referring to FIG. 12, the Case-A PRB is exemplified. Similarly to FIG. 11, the PRB includes 3 sub-parts. If Nd=3, the PRB includes 3 sub-parts. The sub-part consists of a group of clusters. The cluster consists of a plurality of resource elements consecutive in a PDSCH. The 3 sub-parts respectively include 4 RSs, 6 RSs, and 6 RSs. Thus, the number of resource elements other than the RSs may differ from one sub-part to another.

If a granularity of circular shift is 3 PRBs in a frequency domain and one OFDM symbol in a time domain, the 3 sub-parts selected for one VRB are circular shifted in the time prioritized manner in a subframe unit. For example, if it is assumed that 3 VRBs allocated to one UE are transmitted through 3 subframes, a $1^{st}$ sub-part of each of the 3 PRBs is selected for a $1^{st}$ VRB. A $2^{nd}$ sub-part is selected for a $2^{nd}$ VRB. In the $2^{nd}$ sub-part, all clusters are circular shifted by one cluster (i.e., one OFDM symbol) in the time domain. A $3^{rd}$ sub-part is selected for a $3^{rd}$ VRB. In the $3^{rd}$ sub-part, all clusters are circular shifted by one cluster (i.e., one OFDM symbol) in the time domain. The 3 VRBs are mapped to the sub-parts of the PRB, wherein the sub-parts are circular shifted during the 3 subframes.

Figure 13:
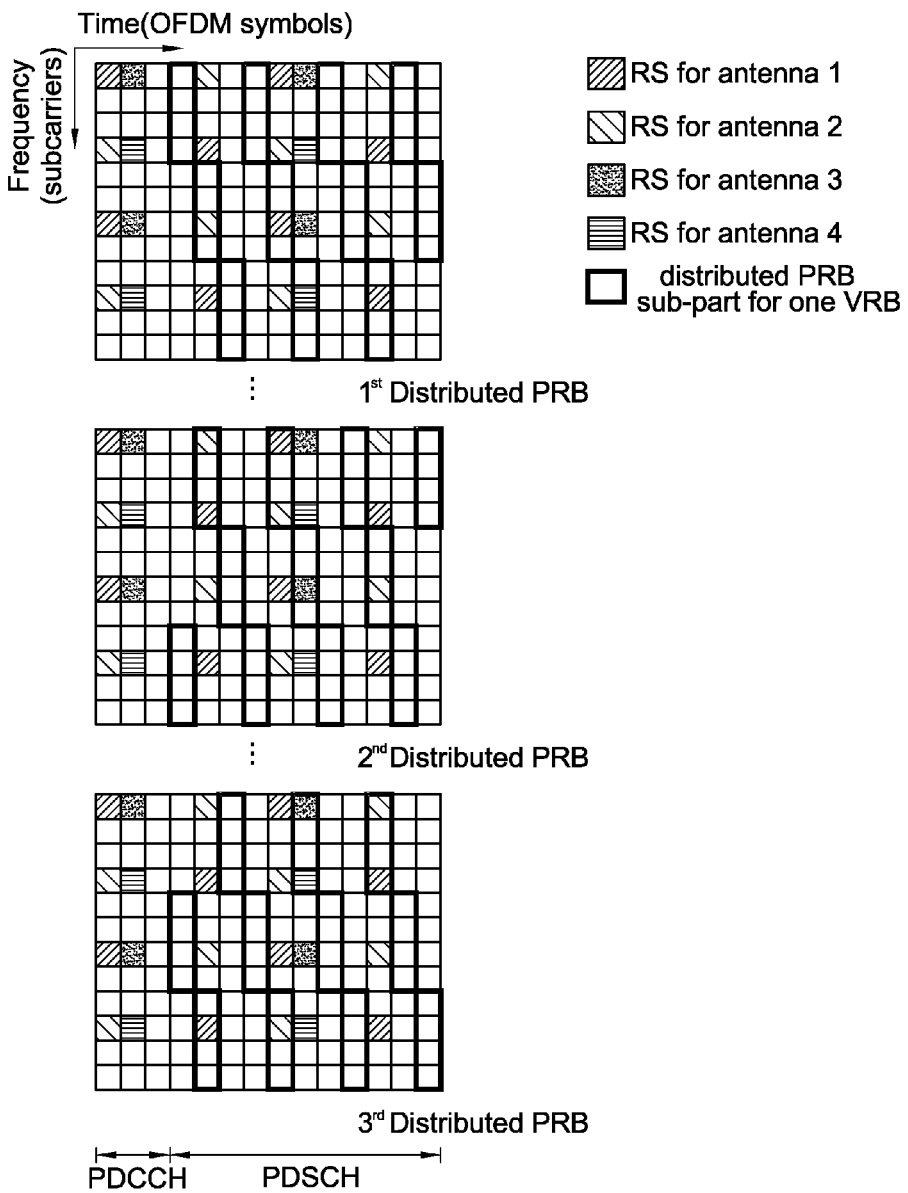
FIG. 13 shows sub-parts of a distributed PRB using CSPSM according to another embodiment of the present invention.

FIG. 13 shows sub-parts of a distributed PRB using CSPSM according to another embodiment of the present invention.

Referring to FIG. 13, the Case-A PRB is exemplified. Similarly to FIG. 11, the PRB includes 3 sub-parts. If Nd=3, the PRB includes 3 sub-parts. The sub-part consists of a group of clusters. The cluster consists of a plurality of resource elements consecutive in a PDSCH. The 3 sub-parts respectively include 4 RSs, 6 RSs, and 6 RSs. Thus, the number of resource elements other than the RSs may differ from one sub-part to another.

If a granularity of circular shift is one PRB in a frequency domain and one OFDM symbol in a time domain, the 3 sub-parts selected for one VRB are circular shifted in the time prioritized manner in a PRB unit. For example, a $1^{st}$ sub-part may be selected in a $1^{st}$ PRB. A $2^{nd}$ sub-part may be selected in a $2^{nd}$ PRB. In the $2^{nd}$ PRB, all clusters are circular shifted by one cluster (i.e., one OFDM symbol) in the time domain. A $3^{rd}$ sub-part may be selected in a $3^{rd}$ PRB. In the $3^{rd}$ PRB, all clusters are circular shifted by one cluster (i.e., one OFDM symbol) in the time domain. One VRB is mapped to the selected 3 sub-parts.

As such, if the 3 VRBs are mapped to the 3 PRBs in one subframe by using the CSPSM in the time prioritized manner, each of the 3 VRBs is equally provided with 16 RSs. That is, the 3 VRBs are respectively mapped to PRBs having the same number of RSs. Accordingly, irrespective of RS arrangement, the same effective code rate can be used for data transmitted using each VRB.

Figure 14:
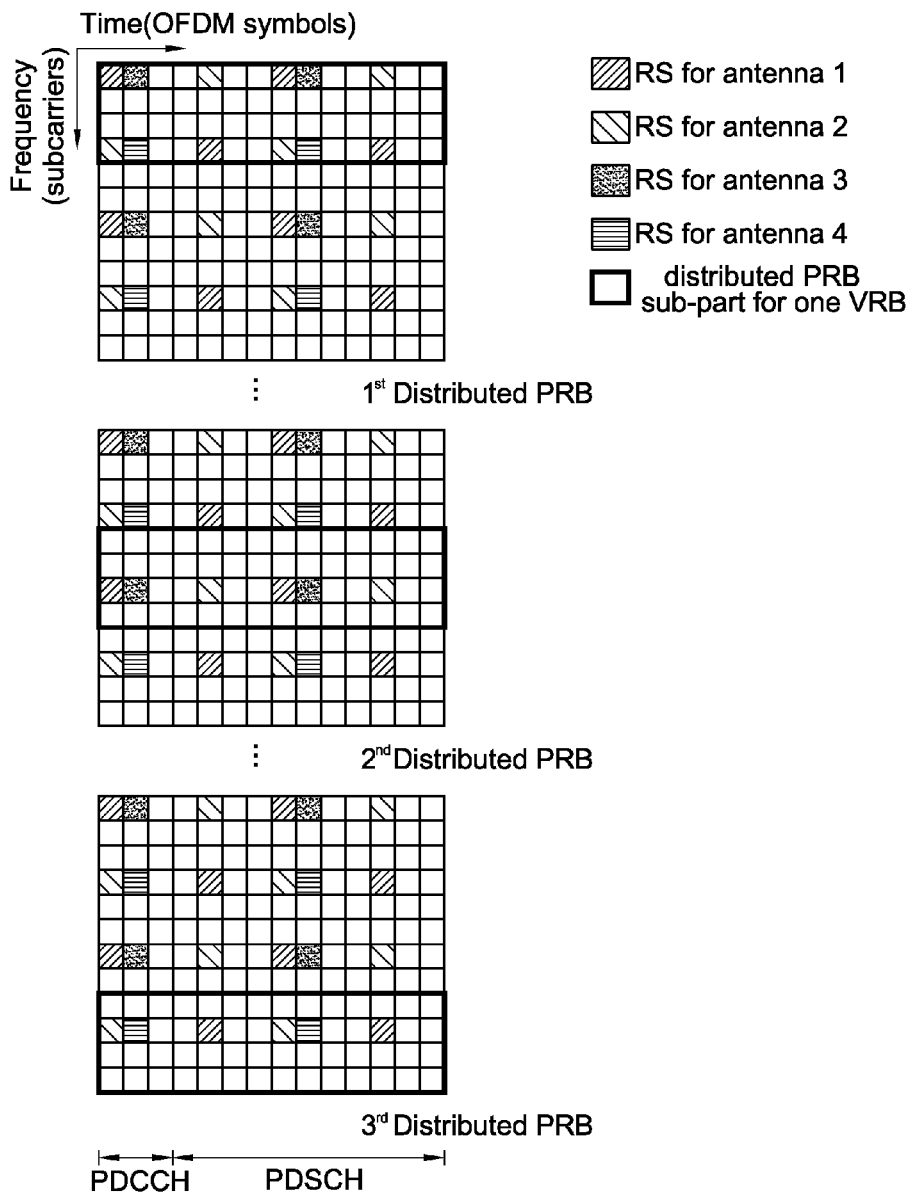
FIG. 14 shows sub-parts of a distributed PRB using CSPSM according to another embodiment of the present invention.

FIG. 14 shows sub-parts of a distributed PRB using CSPSM according to another embodiment of the present invention.

Referring to FIG. 14, the Case-A PRB is exemplified. If Nd=3, the PRB includes 3 sub-parts. In the PRB, a PDCCH and a PDSCH are included in the range of the 3 sub-parts. The sub-part includes OFDM symbols belonging to the PDCCH and the PDSCH in a time domain, and includes 4 subcarriers in a frequency domain. A $1^{st}$ sub-part includes 12 RSs. A $2^{nd}$ sub-part and a $3^{rd}$ sub-part respectively include 6 RSs.

If a granularity of circular shift is one PRB in the frequency domain and one subframe in the time domain, the 3 sub-parts selected in one VRB are circular shifted in the frequency prioritized manner. For example, a $1^{st}$ sub-part may be selected in a $1^{st}$ PRB. A $2^{nd}$ sub-part may be selected in a $2^{nd}$ PRB. In the $2^{nd}$ sub-part, all clusters are circular shifted by one cluster (i.e., 4 subcarriers) in the frequency domain. A $3^{rd}$ sub-part may be selected in a $3^{rd}$ PRB. In the $3^{rd}$ sub-part, all clusters are circular shifted by one cluster (i.e., 4 subcarriers) in the frequency domain. One VRB is mapped to the selected 3 sub-parts.

As such, if the 3 VRBs are mapped to the 3 PRBs by using the CSPSM in the frequency prioritized manner, each of the 3 VRBs is equally provided with 24 RSs. That is, the 3 VRBs are respectively mapped to PRBs having the same number of RSs. Accordingly, irrespective of RS arrangement, the same effective code rate can be used for data transmitted using each VRB.

Figure 15:
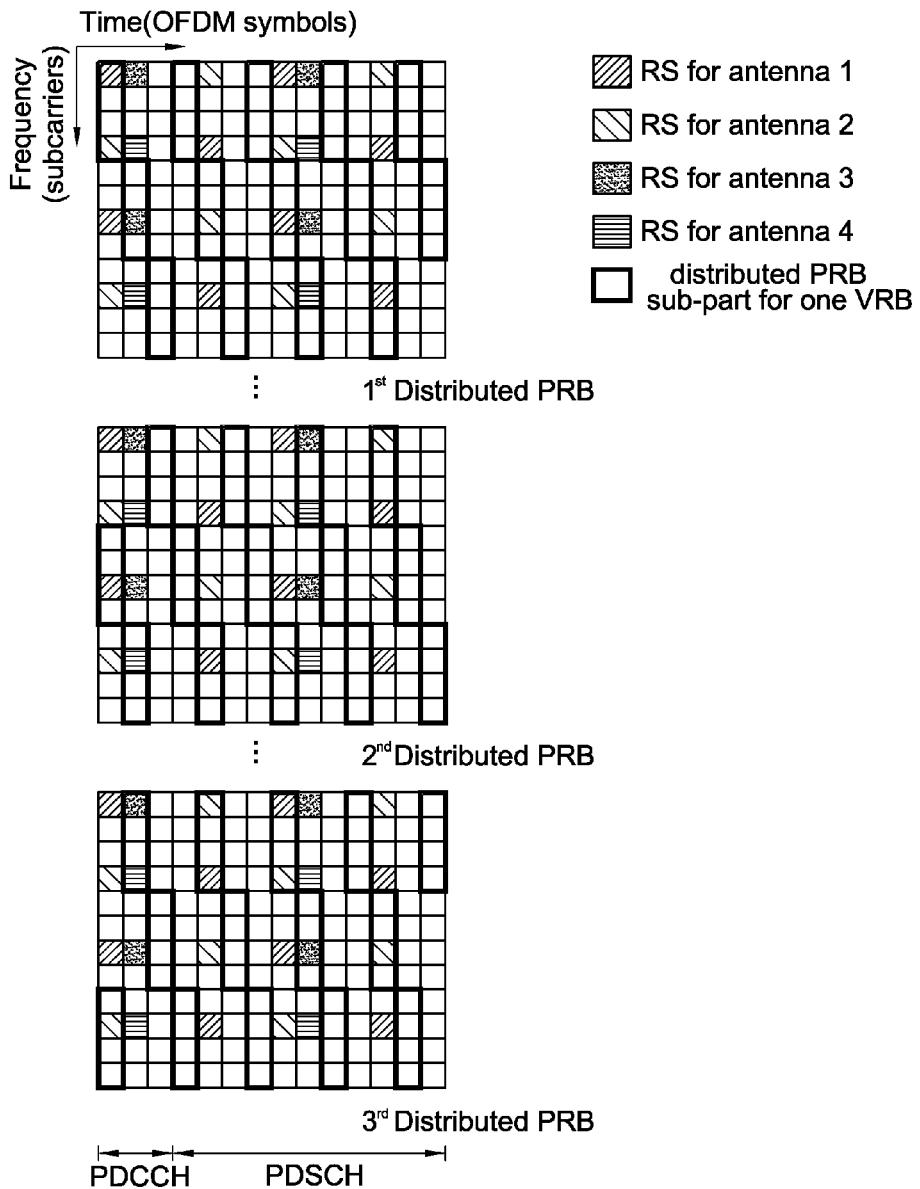
FIG. 15 shows sub-parts of a distributed PRB using CSPSM according to another embodiment of the present invention.

FIG. 15 shows sub-parts of a distributed PRB using CSPSM according to another embodiment of the present invention.

Referring to FIG. 15, the Case-A PRB is exemplified. If Nd=3, the PRB includes 3 sub-parts. The sub-part consists of a group of clusters. The cluster consists of a plurality of resource elements consecutive in a PDSCH and a PDCCH. It is assumed herein that the cluster consists of one OFDM symbol and 4 subcarriers. The 3 sub-parts respectively include 7 RSs, 8 RSs, and 9 RSs. Thus, the number of resource elements other than the RSs may differ from one sub-part to another.

If a granularity of circular shift is one PRB in a frequency domain and one subframe in a time domain, the 3 sub-parts selected in one VRB are circular shifted in the frequency prioritized manner. For example, a $1^{st}$ sub-part may be selected in a $1^{st}$ PRB. A $2^{nd}$ sub-part may be selected in a $2^{nd}$ PRB. In the $2^{nd}$ PRB, all clusters are circular shifted by one cluster (i.e., 4 subcarriers) in the frequency domain. A $3^{rd}$ sub-part may be selected in a $3^{rd}$ PRB. In the $3^{rd}$ PRB, all clusters are circular shifted by one cluster (i.e., 4 subcarriers) in the frequency domain. One VRB is mapped to the selected 3 sub-parts. When the 3 VRBs are mapped to the 3 PRBs, each of the 3 VRBs can be equally provided with 24 RSs.

Figure 16:
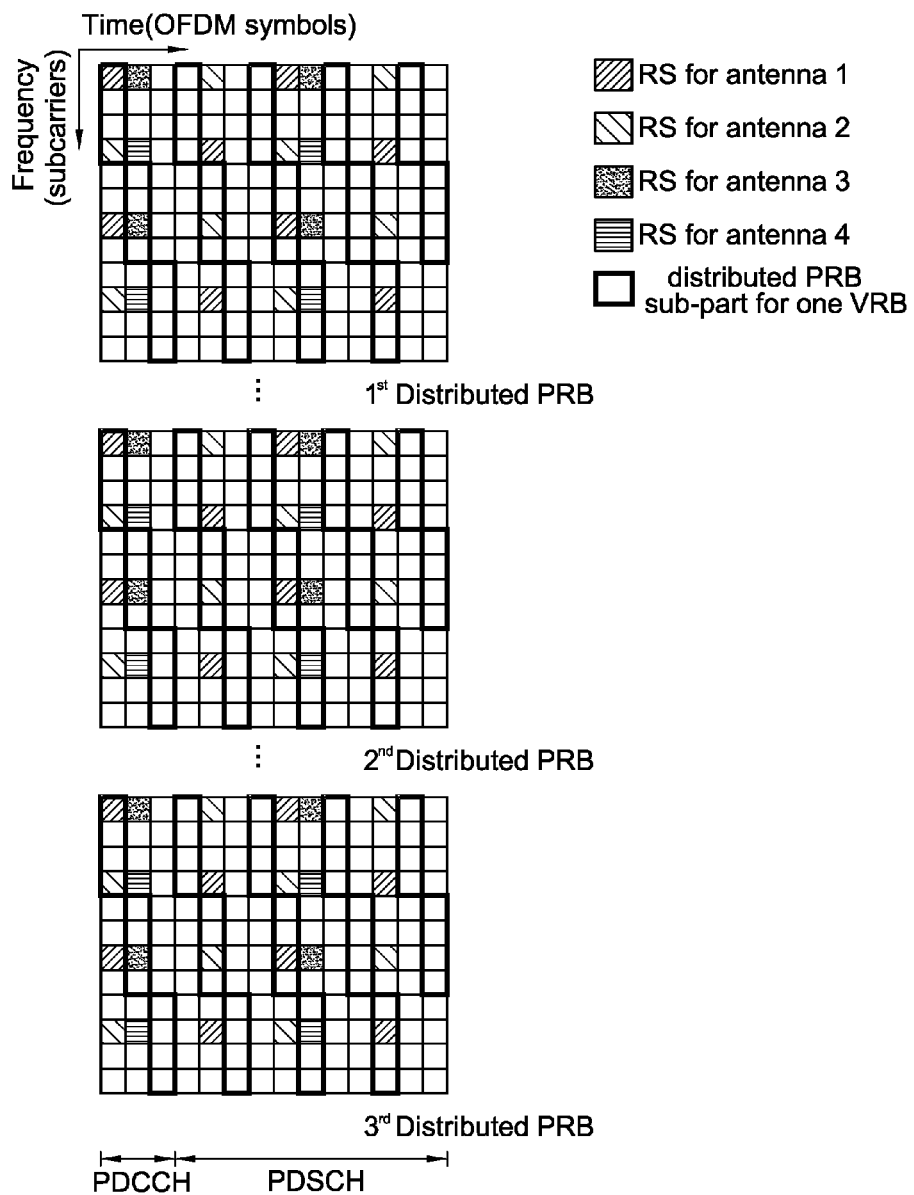
FIG. 16 shows sub-parts of a distributed PRB using CSPSM according to another embodiment of the present invention.

FIG. 16 shows sub-parts of a distributed PRB using CSPSM according to another embodiment of the present invention.

Referring to FIG. 16, the Case-A PRB is exemplified. If Nd=3, the PRB includes 3 sub-parts. The sub-part consists of a group of clusters. The cluster consists of a plurality of resource elements consecutive in a PDSCH and a PDCCH. It is assumed herein that the cluster consists of one OFDM symbol and 4 subcarriers. The 3 sub-parts respectively include 7 RSs, 8 RSs, and 9 RSs. Thus, the number of resource elements other than the RSs may differ from one sub-part to another.

If a granularity of circular shift is 3 PRBs in a frequency domain and one OFDM symbol in a time domain, the 3 sub-parts selected for one VRB are circular shifted in the time prioritized manner in a subframe unit. For example, if it is assumed that 3 VRBs allocated to one UE are transmitted through 3 subframes, a $1^{st}$ sub-part of each of the 3 PRBs is selected for a $1^{st}$ VRB. A $2^{nd}$ sub-part is selected for a $2^{nd}$ VRB. In the $2^{nd}$ sub-part, all clusters are circular shifted by one cluster (i.e., one OFDM symbol) in the time domain. A $3^{rd}$ sub-part is selected for a $3^{rd}$ VRB. In the $3^{rd}$ sub-part, all clusters are circular shifted by one cluster (i.e., one OFDM symbol) in the time domain. The 3 VRBs are mapped to the sub-parts of the PRB, wherein the sub-parts are circular shifted during the 3 subframes.

Figure 17:
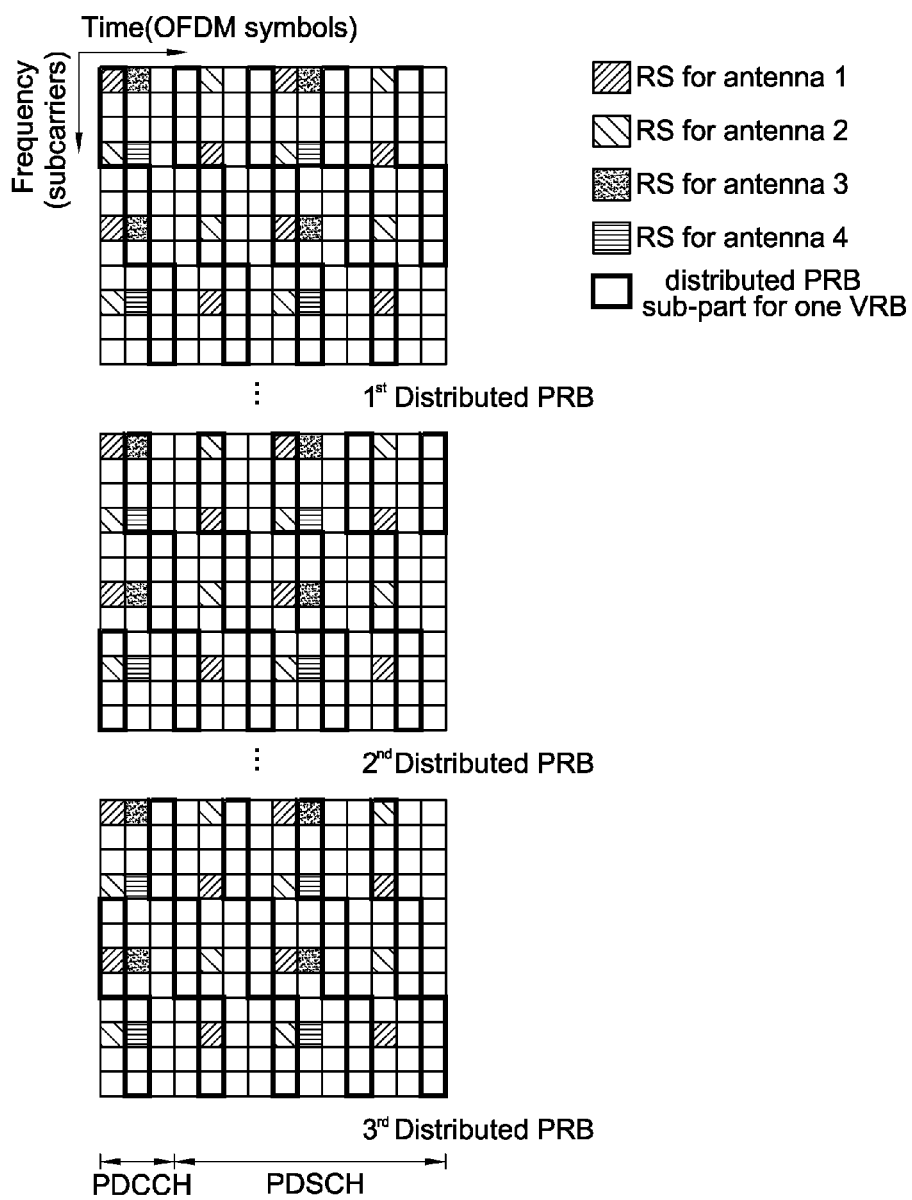
FIG. 17 shows sub-parts of a distributed PRB using CSPSM according to another embodiment of the present invention.

FIG. 17 shows sub-parts of a distributed PRB using CSPSM according to another embodiment of the present invention.

Referring to FIG. 17, the Case-A PRB is exemplified. If Nd=3, the PRB includes 3 sub-parts. Each sub-part consists of a group of clusters. Each cluster consists of a plurality of resource elements consecutive in a PDSCH and a PDCCH. It is assumed herein that the cluster consists of one OFDM symbol and 4 subcarriers. The 3 sub-parts respectively include 7 RSs, 8 RSs, and 9 RSs. Thus, the number of resource elements other than the RSs may differ from one sub-part to another.

If a granularity of circular shift is one PRB in a frequency domain and one OFDM symbol in a time domain, the 3 sub-parts selected for one VRB are circular shifted in the time prioritized manner in a PRB unit. For example, a $1^{st}$ sub-part may be selected in a $1^{st}$ PRB. A $2^{nd}$ sub-part may be selected in a $2^{nd}$ PRB. In the $2^{nd}$ PRB, all clusters are circular shifted by one cluster (i.e., one OFDM symbol) in the time domain. A $3^{rd}$ sub-part may be selected in a $3^{rd}$ PRB. In the $3^{rd}$ PRB, all clusters are circular shifted by one cluster (i.e., one OFDM symbol) in the time domain. One VRB is mapped to the selected 3 sub-parts.

As such, if the 3 VRBs are mapped to the 3 PRBs by using the CSPSM in the time prioritized manner, each of the 3 VRBs is equally provided with 24 RSs. That is, the 3 VRBs are respectively mapped to PRBs having the same number of RSs. Accordingly, irrespective of RS arrangement, the same effective code rate can be used for data transmitted using each VRB.

Figure 18:
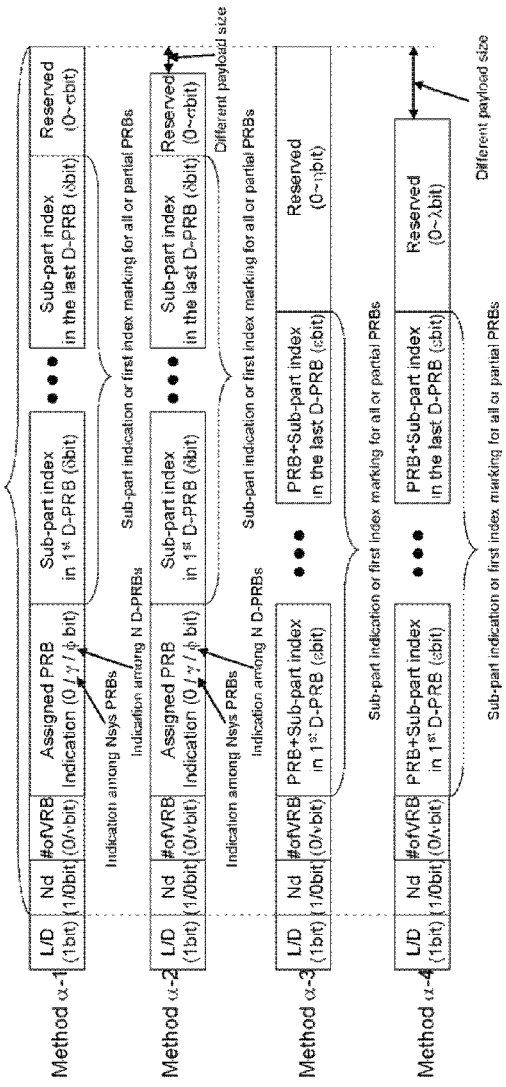
FIG. 18 shows control information for instructing CSPSM according to an embodiment of the present invention.

FIG. 18 shows control information for instructing CSPSM according to an embodiment of the present invention.

Referring to FIG. 18, the control information is necessary to instruct so that a UE can know a sub-part mapped with an arbitrary VRB in the CSPSM method. The UE may implicitly know a relationship of distributed mapping from a VRB to a PRB. The range or number of VRBs subjected to the distributed mapping in a scheduling procedure of a BS may vary. The UE needs to be informed with information regarding the CSPSM method to be used. The control information for instructing CSPSM may be transmitted through a PDCCH. The control information for instructing CSPSM may informed to the UE through a downlink (DL) scheduling channel or through control signaling of a high layer.

The control information for instructing CSPSM is configured with a localized/distributed transmission indication field (or simply L/D field) and a resource assignment field for distributed transmission. That is, for the control information for instructing CSPSM, in addition to the L/D field, an additional dedicated control information field is used to report information regarding sub-parts included in a PRB for distributed transmission. The additional dedicated control information is used by an arbitrary UE. The dedicated control information field may be configured to report all sub-parts of Nd PRBs. Alternatively, if a specific rule is provided for the sub-parts of the Nd PRBs, the dedicated control information field may be configured to report a sub-part index used by a reference PRB.

If an arbitrary VRB is transmitted through distributed mapping onto Nd PRBs and if the number of PRBs used for distributed transmission in the entire system band is equal to or greater than Nd, a length of a resource allocation field of a downlink control channel for reporting the control information regarding distributed transmission may be configured with a payload whose length is different from (in case of methods α-2 and α-4 of FIG. 18) or the same as (in case of methods α-1 and α-3 of FIG. 18) a length of a scheduling channel of localized transmission. If necessary, in addition to the resource allocation field, an additional extra control field may be defined so that the UE can know a sub-part of a PRB to be decoded in conjunction with the resource allocation field and the additional control field. Herein, the extra control field includes an L/D indication, # of VRB, Nd, etc.

The length of the resource allocation field for distributed transmission may be determined to be equal to a full length of a downlink scheduling channel for localized transmission or a payload length such as a compact length. If the length of the resource allocation field for distributed transmission is equal to the length of the downlink scheduling channel, it is possible to reduce an overhead resulted from blind decoding for a control channel when distributed transmission is additionally made on the downlink control channel.

The L/D field indicates whether mapping from a VRB to a PRB is achieved in a localized manner or a distributed manner. The resource allocation field for distributed transmission may include Nd, # of VRB, an assigned PRB, a sub-part indication, etc.

Nd indicates the number of distributed fragments of the VRB or the number of sub-parts divided in one PRB for distributed mapping. The number of bits of Nd may be determined variously. For example, if Nd is transmitted using control signaling of a high layer, the number of bits of Nd may be 0 bit. If Nd is in the range of 1 to 3, the number of bits of Nd may be 2 bits. If Nd is in the range of 4 to 6, the number of bits of Nd may be 3 bits.

The number of VRBs (i.e., # of VRB) specifies the number of PRBs on which distributed transmission is made. The assigned PRB specifies a location of a PRB to be subjected to distributed transmission with respect to all PRBs of the system. The sub-part indication specifies a location of a sub-part of a PRB on which distributed transmission is made. The sub-part indication may specify sub-part indices of all or partial PRBs.

The sub-part indication may be configured in a modified bitmap or simplified bitmap format that can be indicated in a PRB unit. For Nd or more PRBs, the sub-part indication can be configured so that mapping from one or a plurality of VRBs to a PRB can be indicated for each UE.

The CSPSM can be instructed implicitly. A location of a PRB to be subjected to distributed transmission for an arbitrary UE may be determined according to a predetermined method. A sub-part pattern may be determined for each PRB in use. In a state that the sub-part pattern is determined, only a PRB using sub-parts having predetermined orders can be indicated in the control channel. In this case, only a first or last PRB may be indicated among several PRBs in use. Alternatively, a PRB may be fixedly assigned according to an identifier (ID) (or index) of a predetermined UE, and the assigned PRB may not be reported on the control channel.

The CSPSM can be instructed through high layer signaling. In distributed transmission for an arbitrary UE, information (e.g., the number of VRBs, Nd, the number of PRBs, an allocation pattern of PRB, etc.) can be reported through the higher layer signaling. When a sub-part of an arbitrary PRB is used for distributed transmission of an arbitrary VRB, the sub-part may be transmitted by masking a UE ID or a VRB index onto a cyclic redundancy check (CRC). The UE can obtain information regarding the sub-part of the PRB to be received by the UE itself according to blind decoding.

Although the Case-A PRB has been described as an example of a PRB for the proposed CSPSM, this is for exemplary purposes only, and thus the present invention is not limited thereto. The PRB may have a structure of the Case-B PRB or the Case-C PRB. In addition thereto, the PRB may have various structures. The number of OFDM symbols included in the PDCCH or PDSCH in the PRB may vary. The arrangement and number of RSs may also vary. Nd may be 2 or may be selected from other various numbers. If the number of resource elements included in sub-parts change for each sub-part as a result of the various selection of Nd, the proposed CSPSM method can be used. In particular, in a case where RS arrangement is made similarly to any one of the Case-A PRB, Case-B PRB, and Case-C PRB, if Nd=6, the number of resource element for each sub-part may change, and the proposed CSPSM method can be used.

<Mapping on PRB Satisfying Concatenated Mapping Pair>

A multiple input multiple output (MIMO) system is for maximizing throughput and communication capability of a wireless communications system. The MIMO system improves spectral efficiency of Tx/Rx data by employing multiple Tx antennas and multiple Rx antennas. The MIMO system is also referred to as a multiple antenna system. Transmission diversity and spatial multiplexing are representative MIMO techniques. In the transmission diversity, a transmitter transmits one piece of data through multiple paths by using multiple antennas. In the spatial multiplexing, multiple pieces of data are simultaneously transmitted using multiple antennas.

A space-frequency block code (SFBC) is one example of a MIMO technique in which spatial diversity and spatial multiplexing are combined. In the SFBC, selectivity in a spatial domain and a frequency domain is effectively used and thus a diversity gain at a corresponding dimension and a multi-user scheduling gain can be both obtained. Another example of the MIMO technique is a frequency switched transmit diversity (FSTD). In the FSTD, signals transmitted through multiple antennas are identified according to frequency.

The SFBC can be used in a MIMO system employing two Tx antennas. A combination of the SFBC and the FSTD may be used in a MIMO system employing 4 Tx antennas. To use the SFBC alone or the SFBC combined with the FSTD, a concatenated physical resource mapping pair needs to be formed in the frequency domain. That is, when using 2 Tx antennas, 2 resource elements have to form a concatenated physical resource mapping pair in the frequency domain. When using 4 Tx antennas, 2 or 4 resource elements have to form the concatenated physical resource mapping pair in the frequency domain.

When mapping is made from VRBs to PRBs, one VRB may be distributed and mapped to a plurality of PRBs. In this case, the PRB is divided into a plurality of sub-parts, each of which includes RSs. The concatenated mapping pair may not be formed due to the RSs. That is, when an RS occupies one resource element in the frequency domain of a sub-part, the number of resource elements for data is an odd number, and thus the concatenated mapping pair is not formed. Accordingly, there is a limit in the use of the MIMO technique.

Therefore, a method for maintaining a concatenated mapping pair is necessary so that the MIMO technique can be flexibly applied when distributed mapping from a VRB to a PRB is performed. Hereinafter, a PRB structure in which all sub-parts satisfy a concatenated mapping pair condition will be described.

Figure 19:
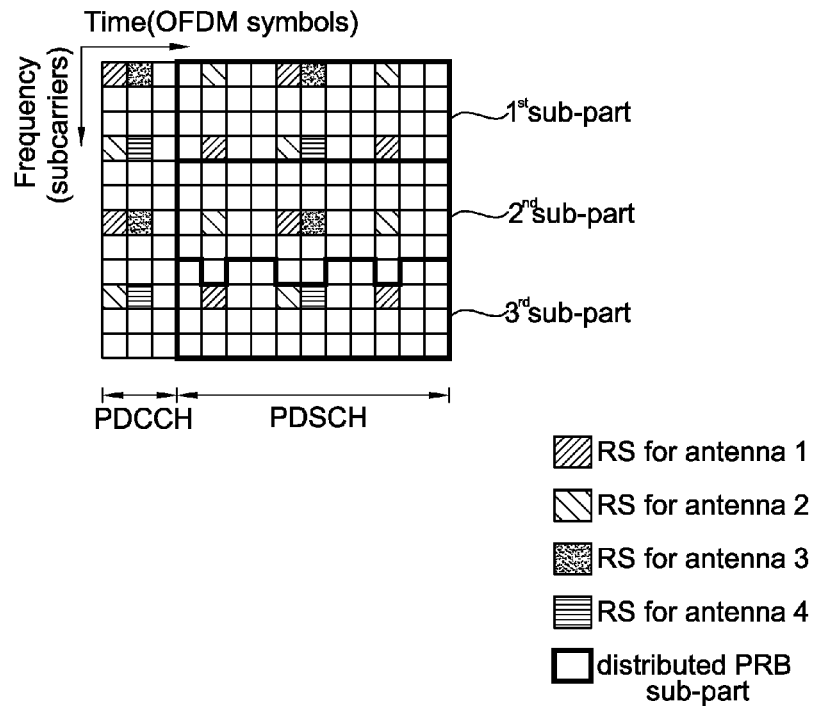
FIG. 19 shows a structure of a distributed PRB according to an embodiment of the present invention.

FIG. 19 shows a structure of a distributed PRB according to an embodiment of the present invention.

Referring to FIG. 19, the Case-A PRB is exemplified. The PRB includes a plurality of sub-parts. A PRB including a plurality of sub-parts and using distributed mapping can be referred to as a distributed PRB. In a process of distributed mapping from a VRB to the PRB, the number Nd of sub-parts can be determined according to the number of distributed fragments of the VRB.

If Nd=3, one PRB is divided into 3 sub-parts. The divided 3 sub-parts satisfy the concatenated mapping pair condition. For example, each sub-part includes OFDM symbols belonging to a PDSCH in a time domain and also includes 4 subcarriers in a frequency domain, wherein, regarding OFDM symbols of which the number of resource elements along the frequency domain is not 2 or 4, one element is exchanged between sub-parts not satisfying the concatenated mapping pair condition due to RSs. That is, for the sub-parts not satisfying the concatenated mapping pair condition, concave or convex portions are non-equidistantly formed in OFDM symbols assigned with the RSs.

In a $1^{st}$ sub-part, each OFDM symbol includes 2 or 4 resource elements along the frequency domain, thereby satisfying the concatenated mapping pair condition. In a $2^{nd}$ sub-part, each OFDM symbol assigned with an RS includes one resource element belonging to a $3^{rd}$ sub-part, thereby having 4 resource elements in total. That is, in the $2^{nd}$ sub-part, the concatenated mapping pair condition can be satisfied when each OFDM symbol assigned with an RS is extended by one resource element. In the $3^{rd}$ sub-part, each OFDM symbol assigned with an RS includes one resource element belonging to the $2^{nd}$ sub-part, thereby having 2 resource elements in total. That is, in the $3^{rd}$ sub-part, the concatenated mapping pair condition can be satisfied when the OFDM symbol assigned with an RS is reduced by one resource element. Therefore, each of the 3 sub-parts of the PRB includes 2 or 4 resource elements along the frequency domain, thereby satisfying the concatenated mapping pair condition.

Figure 20:
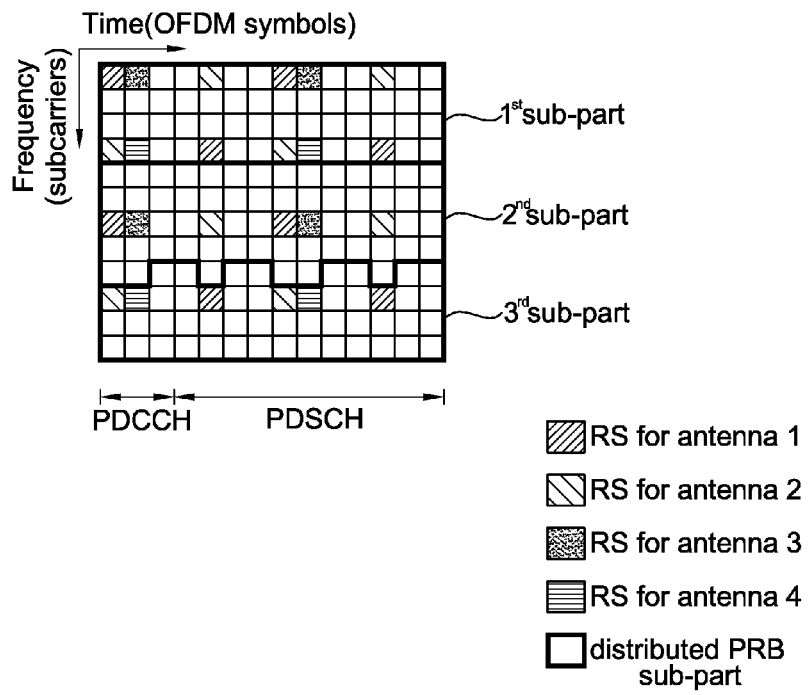
FIG. 20 shows a structure of a distributed PRB according to another embodiment of the present invention.

FIG. 20 shows a structure of a distributed PRB according to another embodiment of the present invention.

Referring to FIG. 20, the Case-A PRB is exemplified. This is a case where a sub-part includes OFDM symbols belonging to a PDSCH and a PDCCH.

If Nd=3, one PRB is divided into 3 sub-parts. The divided 3 sub-parts satisfy the concatenated mapping pair condition. Each sub-part includes OFDM symbols belonging to the PDSCH and the PDCCH in a time domain and also includes 4 subcarriers in a frequency domain, wherein, regarding OFDM symbols of which the number of resource elements along the frequency domain is not 2 or 4, one element is exchanged between sub-parts not satisfying the concatenated mapping pair condition due to RSs. That is, for the sub-parts not satisfying the concatenated mapping pair condition, concave or convex portions are non-equidistantly formed in OFDM symbols assigned with the RSs.

As such, a distributed PRB has a structure in which the concatenated mapping pair condition is satisfied by exchanging one resource element between sub-parts not satisfying the concatenated mapping pair condition. The structure can be also applied to the Case-B PRB and the Case-C PRB.

The aforementioned structures of the PRB (e.g., Case-A PRB, Case-B PRB, and Case-C PRB) are for exemplary purposes only. The range of the PRB may change in the time domain or the frequency domain. The number of OFDM symbols included in the PDCCH or the PDSCH may also change. The range and number of sub-parts may change. The location and number of RSs may change.

If all sub-parts included in the PRB are divided to satisfy the concatenated mapping pair condition, the number of resource elements mapped with actual data symbols may differ from one sub-part to another. In case of FIG. 19, the $1^{st}$ sub-part includes 36 resource elements other than 8 RSs. The $2^{nd}$ sub-part includes 44 resource elements other than 4 RSs. The $3^{rd}$ sub-part includes 36 resource elements other than 4 RSs. In case of FIG. 20, the $1^{st}$ sub-part includes 44 resource elements other than 12 RSs. The $2^{nd}$ sub-part includes 56 resource elements other than 6 RSs. The $3^{rd}$ sub-part includes 44 resource elements other than 6 RSs.

Although each sub-part includes a different number of resource elements, when one VRB is continuously mapped to a sub-part having a small number of resource elements, a difference in the number of resource elements is continuously accumulated. When data is transmitted using a small number of resource elements, an effective code rate increases. Data transmission is vulnerable to a channel environment when the effective code rate increases. Changes in the number of resource elements for each sub-part may result in changes in the effective code rate. Then, transmission of the data may be vulnerable to the channel environment in comparison with transmission of other data. In addition, although the same-sized VRB is allocated for each UE, an amount of data transmittable by one UE may decrease in comparison with that of another UE in a process of mapping from the VRB to the PRB.

Hereinafter, a method for maintaining an effective code rate that may change due to a difference in the number of resource elements for each sub-part will be described.

Figure 21:
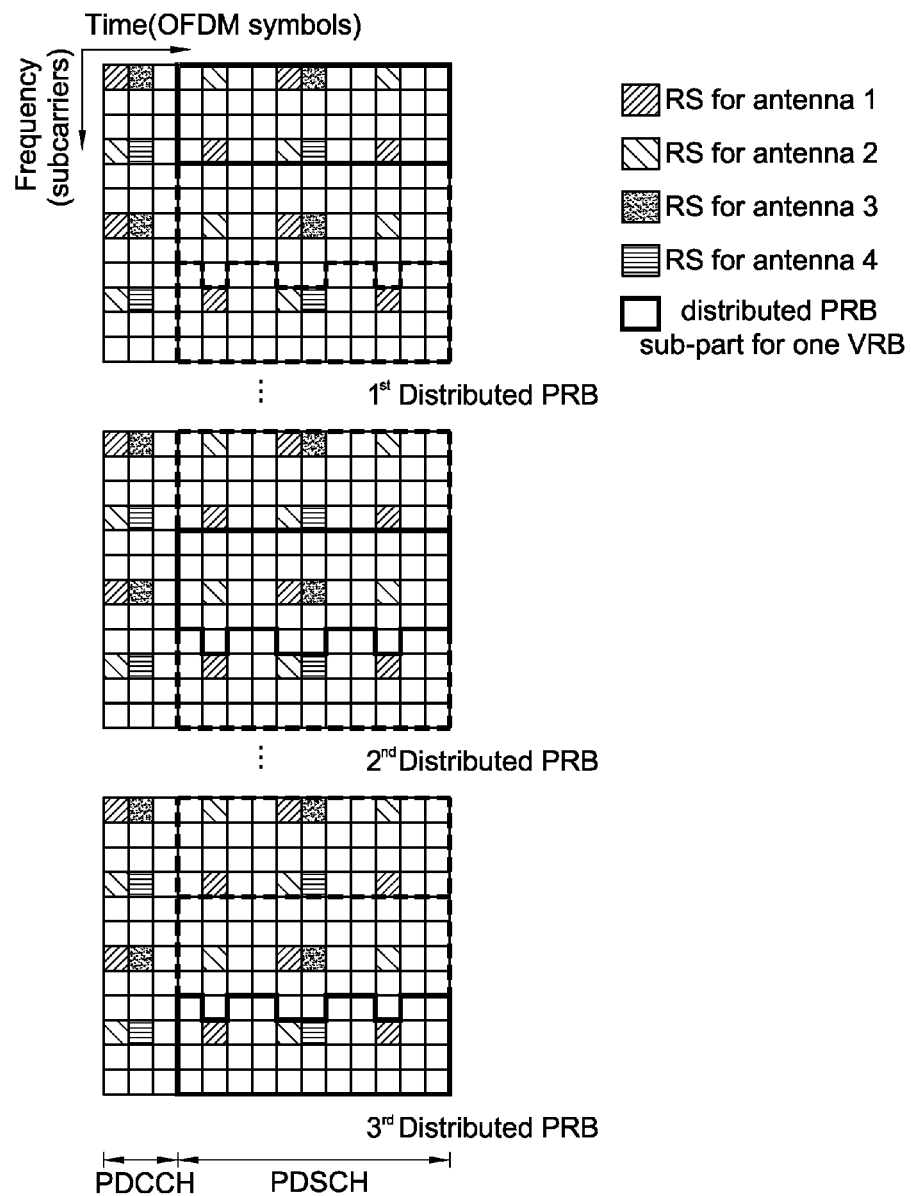
FIG. 21 shows sub-parts of a distributed PRB using CSPSM according to an embodiment of the present invention.

FIG. 21 shows sub-parts of a distributed PRB using CSPSM according to an embodiment of the present invention.

Referring to FIG. 21, in a process of distributed mapping from VRBs to PRBs, the VRB is circular shifted over Nd sub-parts that occupy different positions in the PRB in the distributed mapping. In other words, sub-parts corresponding to one VRB are circular shifted in Nd PRBs. This is called circular shifted PRB sub-part mapping (CSPSM). According to a type of sub-part, the circular shift may be achieved in the frequency prioritized manner or the time prioritized manner.

It will be assumed that the PRB is divided into 3 sub-parts as shown in FIG. 19. In this case, the VRBs are mapped to the sub-parts which are circular shifted in the frequency prioritized manner. A granularity of circular shift is one PRB in a frequency domain and one subframe in a time domain. As for a $1^{st}$ VRB, 3 sub-parts occupying different positions in the 3 PRBs are selected.

For example, a $1^{st}$ sub-part may be selected in a $1^{st}$ PRB. A $2^{nd}$ sub-part may be selected in a $2^{nd}$ PRB. A $3^{rd}$ sub-part may be selected in a $3^{rd}$ PRB. The $1^{st}$ VRB is mapped to the selected 3 sub-parts. Since the sub-parts are selected by being circular shifted in the frequency domain according to the PRBs, it can be said that the circular shift is achieved in the frequency prioritized manner. The $1^{st}$ sub-part includes 8

RSs. The 2$^{nd}$ sub-part and the 3$^{rd}$ sub-part respectively include 4 RSs. That is, 16 RSs are provided to the 1$^{st}$ VRB.

As for a 2$^{nd}$ VRB, a 2$^{nd}$ sub-part is selected in the 1$^{st}$ PRB, a 3$^{rd}$ sub-part is selected in the 2$^{nd}$ PRB, and a 1$^{st}$ sub-part is selected in the 3$^{rd}$ PRB. The 2$^{nd}$ VRB is mapped to the selected 3 sub-parts. 16 RSs are provided to the 2$^{nd}$ VRB.

As for a 3$^{rd}$ VRB, a 3$^{rd}$ sub-part is selected in the 1$^{st}$ PRB, a 1$^{st}$ sub-part is selected in the 2$^{nd}$ PRB, and a 2$^{nd}$ sub-part is selected in the 3$^{rd}$ PRB. The 3$^{rd}$ VRB is mapped to the selected 3 sub-parts. 16 RSs are provided to the 3$^{rd}$ VRB.

As a result, the 3 VRBs are respectively mapped to PRBs having the same number of RSs. That is, the 3 VRBs are respectively mapped to PRBs having the same number of resource elements. Sub-parts are divided to have 2 or 4 resource elements other than RSs along the frequency domain and then are subjected to the distributed mapping using the CSPSM method. Therefore, the concatenated mapping pair condition can be satisfied. In addition, each VRB can use the same number of resource elements. Accordingly, the same effective code rate can be used.

Figure 22:
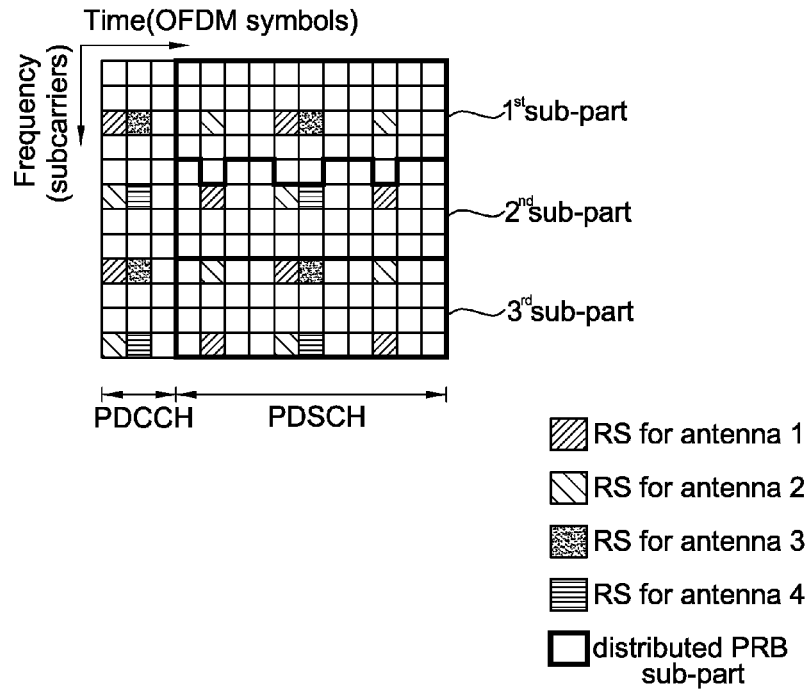
FIG. 22 shows a structure of a distributed PRB according to an embodiment of the present invention.

FIG. 22 shows a structure of a distributed PRB according to an embodiment of the present invention.

Referring to FIG. 22, RSs are arranged in the same pattern as the Case-C PRB. A sub-part includes OFDM symbols belonging to a PDSCH in a time domain.

If Nd=3, the PRB is divided into 3 sub-parts satisfying the concatenated mapping pair condition. Each sub-part includes OFDM symbols belonging to the PDSCH in the time domain and also includes 4 subcarriers in a frequency domain. A 1$^{st}$ sub-part is extended by one resource element in each OFDM symbol assigned with an RS. A 2$^{nd}$ sub-part is reduced by one resource element in each OFDM symbol assigned with an RS. Along the frequency domain, each of the 3 sub-parts includes N resource elements (where N is a multiple of 2), that is, 2 or 4 resource elements, thereby satisfying the concatenated mapping pair condition.

Figure 23:
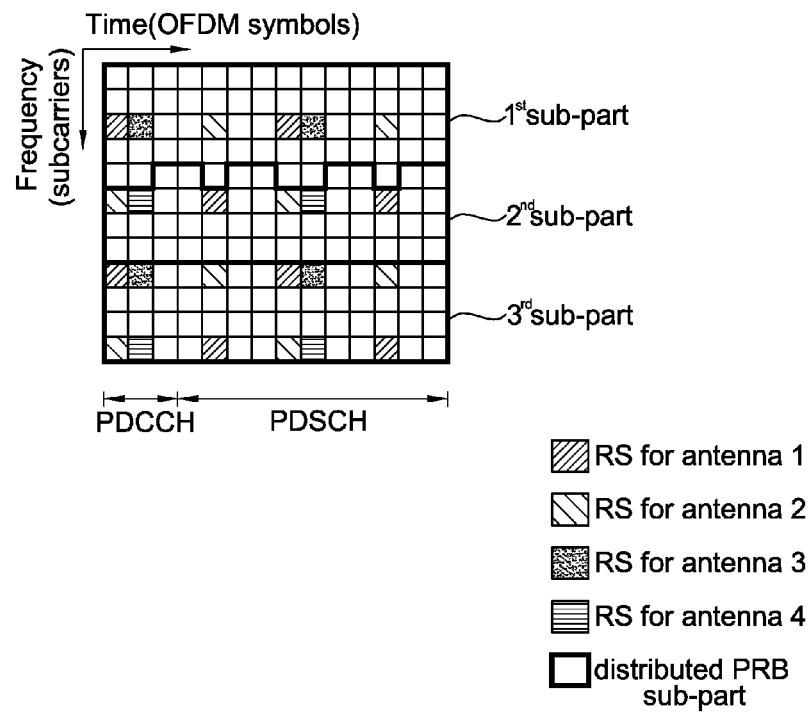
FIG. 23 shows a structure of a distributed PRB according to another embodiment of the present invention.

FIG. 23 shows a structure of a distributed PRB according to another embodiment of the present invention.

Referring to FIG. 23, RSs are arranged in the same pattern as the Case-C PRB. A sub-part includes OFDM symbols belonging to a PDSCH and a PDCCH in a time domain.

If Nd=3, the PRB is divided into 3 sub-parts satisfying the concatenated mapping pair condition. Each sub-part includes OFDM symbols belonging to the PDSCH and the PDCCH in the time domain and includes 4 subcarriers in a frequency domain. A 1$^{st}$ sub-part is extended by one resource element in each OFDM symbol assigned with an RS. A 2$^{nd}$ sub-part is reduced by one resource element in each OFDM symbol assigned with an RS. Each of the 3 sub-parts includes 2 or 4 resource elements along the time domain, thereby satisfying the concatenated mapping pair condition.

A frequency division multiplexing (FDM) scheme in which a PRB is divided into sub-parts in the frequency domain has been described above. Hereinafter, a time division multiplexing (TDM) scheme in which the PRB is divided into sub-parts in the time domain and a TDM/FDM combined scheme will be described.

Figure 24:
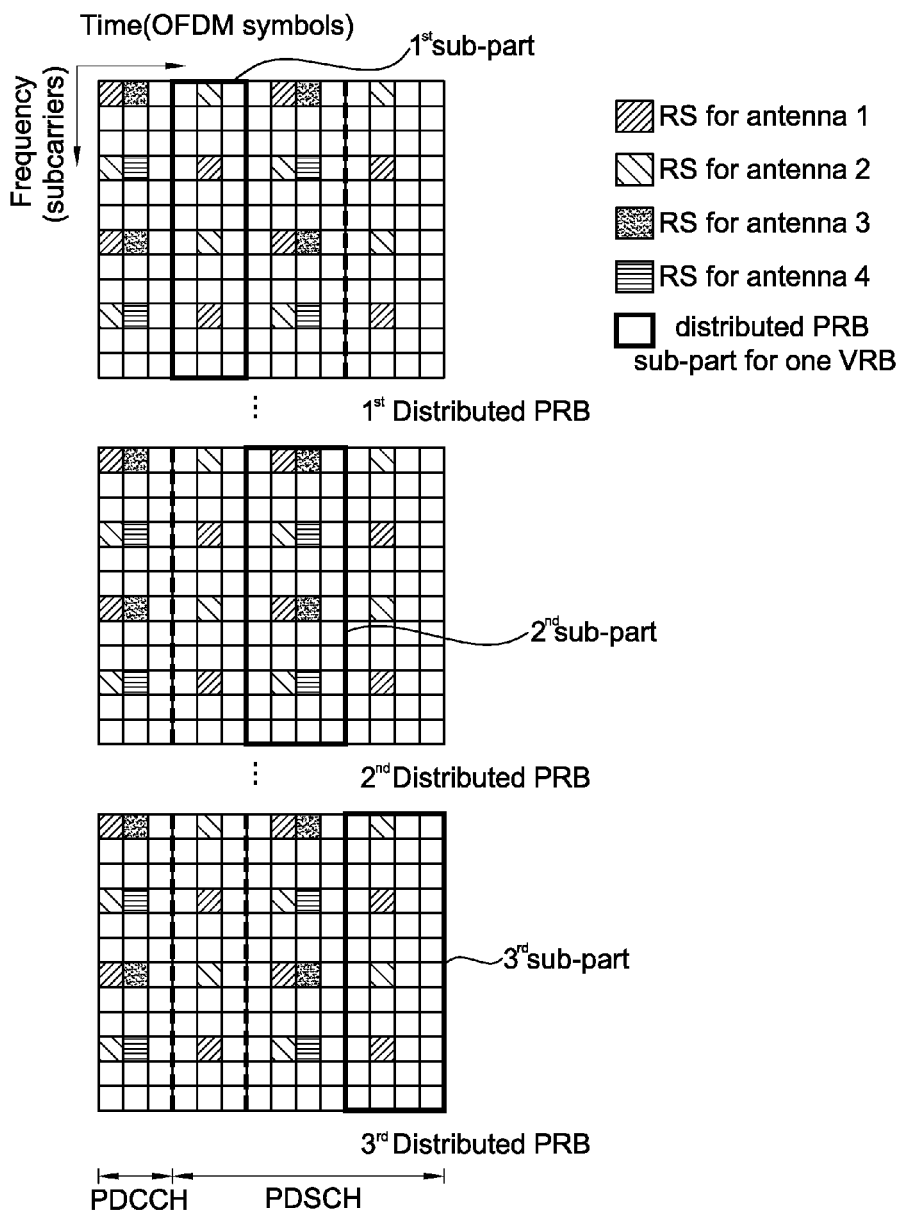
FIG. 24 shows a structure of a distributed PRB according to another embodiment of the present invention.

FIG. 24 shows a structure of a distributed PRB according to another embodiment of the present invention. This is a case where the CSPSM method is used by dividing the Case-A PRB into sub-parts in a time domain.

Referring to FIG. 24, the PRB can be divided into sub-parts in the time domain. The sub-parts divided in the time domain can be assigned to different UEs. This can be called the TDM scheme.

If Nd=3 in the TDM scheme, 3 sub-parts divided in the time domain are present in a PDSCH. A 1$^{st}$ sub-part includes 3 OFDM symbols in the time domain and 12 subcarriers in a frequency domain, and is arranged with 4 RSs. A 2$^{nd}$ sub-part includes 4 OFDM symbols in the time domain and 12 subcarriers in the frequency domain, and is arranged with 8 RSs. A 3$^{rd}$ sub-part includes 4 OFDM symbols in the time domain and 12 subcarriers in the frequency domain, and is arranged with 4 RSs. Regarding an OFDM symbol assigned with an RS, each sub-part includes 8 resource elements. Regarding an OFDM symbol not assigned with an RS, each sub-part includes 12 resource elements. That is, all sub-parts include a predetermined number of resource elements along the frequency domain, wherein the predetermined number is a multiple of 2, thereby satisfying the concatenated mapping pair condition.

If a granularity of circular shift is one PRB in the frequency domain and one subframe in the time domain, by using the CSPSM method, one VRB can be mapped in a distributed manner to 3 sub-parts occupying different temporal positions in the PRB. The PRB is divided in the time domain and is mapped in a distributed manner using the CSPSM method. Therefore, the concatenated mapping pair condition can be satisfied. In addition, each VRB can use the same number of resource elements. Accordingly, the same effective code rate can be used.

Figure 25:
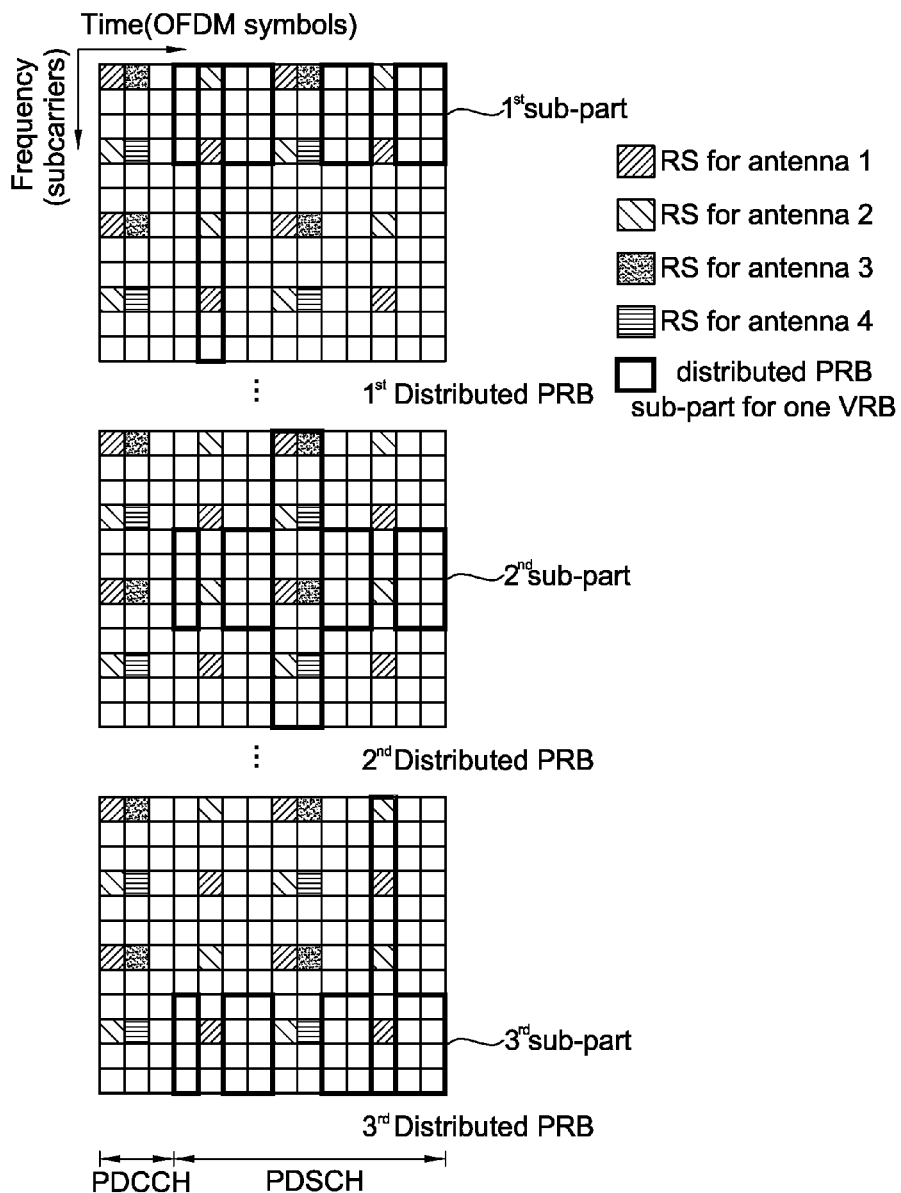
FIG. 25 shows a structure of a distributed PRB according to another embodiment of the present invention.

FIG. 25 shows a structure of a distributed PRB according to another embodiment of the present invention. This is a case where the CSPSM method is used by dividing the Case-A PRB into sub-parts in a time domain and a frequency domain.

Referring to FIG. 25, the PRB can be divided into sub-parts in the time domain and the frequency domain. The sub-parts divided in the time domain and the frequency domain can be assigned to different UEs. This can be called a TDM/FDM combination scheme.

If Nd=3 in the TDM/FDM combination scheme, 3 sub-parts divided in the time domain and the frequency domain are present in a PDSCH. Regarding an OFDM symbol assigned with an RS, the divided 3 sub-parts are present along the time domain. Regarding an OFDM symbol not assigned with an RS, the divided 3 sub-parts are present along the frequency domain. In case of a 1$^{st}$ sub-part, regarding an OFDM symbol not assigned with an RS, 4 subcarriers are included along the frequency domain. Regarding an OFDM symbol assigned with an RS, a 1$^{st}$ OFDM symbol belonging to the PDSCH is included along the time domain. In case of a 2$^{nd}$ sub-part, regarding an OFDM symbol not assigned with an RS, 4 subcarriers are included along the frequency domain. Regarding an OFDM symbol assigned with an RS, 2$^{nd}$ and 3$^{rd}$ OFDM symbols belonging to the PDSCH are included along the time domain. In case of a 3$^{rd}$ sub-part, regarding an OFDM symbol not assigned with an RS, 4 subcarriers are included along the frequency domain. Regarding an OFDM symbol assigned with an RS, a 4$^{th}$ OFDM symbol belonging to the PDSCH is included along the time domain.

As such, regarding an OFDM symbol not assigned with an RS, each sub-part includes 4 resource elements along the frequency domain, thereby satisfying the concatenated mapping pair condition. In addition, regarding an OFDM symbol assigned with an RS, each sub-part includes 8 resource elements, thereby satisfying the concatenated mapping pair condition. When sub-parts are divided in the TDM/FDM combination scheme according to arrangement of RSs, all sub-parts can satisfy the concatenated mapping pair condition.

If a granularity of circular shift is one PRB in the frequency domain and one subframe in the time domain, by using the CSPSM method, one VRB can be mapped in a distributed manner to 3 sub-parts occupying different temporal and spectral positions in the PRB. The PRB is divided according to the TDM/FDM combination scheme and is mapped in a distributed manner using the CSPSM method. Therefore, the concatenated mapping pair condition can be satisfied. In addition, each VRB can use the same number of resource elements. Accordingly, the same effective code rate can be used.

In the above descriptions on the CSPSM method, mapping starts with a $1^{st}$ sub-part of a VRB. However, this is only an example of mapping on sub-parts of a circular shifted PRB. According to the CSPSM method, the VRB can be mapped starting with an arbitrary sub-part. Irrespective of a mapping order, PRB mapping can be made onto sub-parts located in different positions in a frequency domain (FDM scheme), a time domain (TDM scheme), or time/frequency domains (TDM/FDM combination scheme). In the TDM scheme and the TDM/FDM combination scheme, OFDM symbols belonging to a PDSCH and a PDCCH can be included in the range of the sub-parts. In addition, the structure of PRB may change variously. The number of OFDM symbols included in the PDSCH or the PDSCH may vary. The arrangement and number of RSs may also vary. According to the arrangement of RSs, sub-parts can be divided non-equidistantly in various manners. Nd may be 2 or may be selected from other various numbers.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. An apparatus for wireless communication, the apparatus comprising:
a radio frequency (RF) unit for transmitting and receiving radio signals; and
a processor coupled with the RF unit and configured for:
selecting sub-parts, wherein each of the sub-parts is selected from different physical resource blocks (PRBs) and occupies different positions in each of the PRBs, each of the PRBs comprising consecutive orthogonal frequency division multiplexing (OFDM) symbols in time domain and consecutive subcarriers in frequency domain;
mapping the sub-parts to virtual resource blocks (VRBs), wherein N sub-parts are mapped to one VRB, where N is an integer greater than 1; and
transmitting data using the VRBs,
wherein at least one of the N sub-parts comprises a different number of reference signal-resource elements (RS-REs) compared to the remaining sub-parts among the N sub-parts, and
the N sub-parts are selected such that each of the mapped VRBs comprises a same number of RS-REs, and
the data is transmitted using the remaining resource elements except the RS-REs in the mapped VRBs; and
when the data is transmitted by using the mapped VRBs, a same effective code rate is used for the mapped VRBs.

2. The apparatus of claim 1, wherein the N sub-parts are located in different positions in frequency domain in each physical resource block.

3. The apparatus of claim 1, wherein the N sub-parts are located in different positions in time domain in each physical resource block.

4. A method for allocating resources in a wireless communication system, the method comprising:
selecting sub-parts, wherein each of the sub-parts is selected from different physical resource blocks (PRBs) and occupies different positions in each of the PRBs, each of the PRBs comprising consecutive orthogonal frequency division multiplexing (OFDM) symbols in time domain and consecutive subcarriers in frequency domain;
mapping the sub-parts to virtual resource blocks (VRBs), wherein N sub-parts are mapped to one VRB, where N is an integer greater than 1; and
transmitting data using the VRBs, wherein at least one of the N sub-parts comprises a different number of reference signal-resource elements (RS-REs) compared to the remaining sub-parts among the N sub-parts, and
the N sub-parts are selected such that each of the mapped VRBs comprises a same number of RS-REs, and
the data is transmitted using the remaining resource elements except the RS-REs in the mapped VRBs; and
when the data is transmitted by using the mapped VRBs, a same effective code rate is used for the mapped VRBs.

5. The method of claim 4, wherein the N sub-parts are located in different positions in frequency domain in each physical resource block.

6. The method of claim 4, wherein the N sub-parts are located in different positions in time domain in each physical resource block.

* * * * *